(12) United States Patent
Day

(10) Patent No.: US 7,251,670 B1
(45) Date of Patent: Jul. 31, 2007

(54) METHODS AND APPARATUS FOR REPLICATING A CATALOG IN A CONTENT DISTRIBUTION NETWORK

(75) Inventor: Mark Stuart Day, Milton, MA (US)

(73) Assignee: Cisco Technology, Inc., San Jose, CA (US)

( * ) Notice: Subject to any disclaimer, the term of this patent is extended or adjusted under 35 U.S.C. 154(b) by 679 days.

(21) Appl. No.: 10/320,154

(22) Filed: Dec. 16, 2002

(51) Int. Cl.
G06F 17/30 (2006.01)
G06F 7/00 (2006.01)

(52) U.S. Cl. .......................... 707/203; 707/10
(58) Field of Classification Search ................ 707/203, 707/10
See application file for complete search history.

(56) References Cited

U.S. PATENT DOCUMENTS 5,600,834 A * 2/1997 Howard ...................... 707/201
5,721,919 A * 2/1998 Morel et al. ................ 707/203
5,991,771 A * 11/1999 Falls et al. .................. 707/202
2001/0042073 A1* 11/2001 Saether et al. .............. 707/203

* cited by examiner

Primary Examiner—John Cottingham
Assistant Examiner—Kimberly Lovel
(74) Attorney, Agent, or Firm—Chapin IP Law, LLC; Barry W. Chapin, Esq.

(57) ABSTRACT

The invention is directed to techniques, in a first content distribution node, for maintaining a first catalog of a first content distribution node. The first content distribution node detects a modification condition associated with the first catalog of the first content distribution node. The modification condition identifies a potential requirement to modify the first catalog. In response to detecting the modification condition, the first content distribution node performs a version-based comparison technique on the first catalog. The version-based comparison technique compares at least one of gap version information and entry version information associated with the modification condition to gap version information and entry version information associated with the first catalog to identify a catalog change condition. If the catalog change condition indicates that a catalog modification is required for the first catalog, the first content distribution node modifies the first catalog in accordance with the catalog change condition.

40 Claims, 14 Drawing Sheets

320 ↘

244
COMPARE A FIRST CATALOG ENTRY OF THE FIRST CATALOG WITHIN THE FIRST CONTENT DISTRIBUTION NODE WITH A SECOND CATALOG ENTRY IN A SECOND CATALOG ACCESSED FROM AT LEAST ONE SECOND CONTENT DISTRIBUTION NODE TO IDENTIFY A DIFFERENCE BETWEEN THE FIRST AND SECOND CATALOG THUS INDICATING A MODIFICATION CONDITION

332
SEARCH THE FIRST CATALOG WITH A SECOND CATALOG ENTRY KEY TO LOCATE THE FIRST CATALOG ENTRY

334
IF THE FIRST CATALOG ENTRY IS NOT FOUND, TRIGGER THE MODIFICATION CONDITION ASSOCIATED WITH THE FIRST CATALOG OF THE FIRST CONTENT DISTRIBUTION NODE

OR

336
IF THE FIRST CATALOG ENTRY IS FOUND, TRIGGER THE MODIFICATION CONDITION IF ENTRY VERSION INFORMATION FROM THE FIRST CATALOG ENTRY IS DIFFERENT FROM ENTRY VERSION INFORMATION FROM THE SECOND CATALOG ENTRY

OR

338
PROVIDE THE FIRST CATALOG ENTRY FOR COMPARISON TO A CATALOG GAP THAT CORRESPONDS TO THE FIRST CATALOG ENTRY

340
RECEIVE FROM THE SECOND CATALOG, GAP VERSION INFORMATION OF THE SECOND CATALOG GAP, IN RESPONSE TO PROVIDING THE FIRST CATALOG ENTRY

342
IF THE ENTRY VERSION INFORMATION OF THE FIRST CATALOG ENTRY IS OLDER THAN THE GAP VERSION INFORMATION OF THE SECOND CATALOG GAP, TRIGGER THE MODIFICATION CONDITION ASSOCIATED WITH THE FIRST CATALOG OF THE FIRST CONTENT DISTRIBUTION NODE

364
THE FIRST CATALOG ASSOCIATED WITH THE FIRST CONTENT DISTRIBUTION NODE CONTAINS THE FIRST CATALOG ENTRY FOR WHICH THE SECOND CATALOG OF THE SECOND CONTENT DISTRIBUTION NODE DOES NOT CONTAIN AN MATCHING SECOND CATALOG ENTRY AT THE CORRESPONDING SECOND CATALOG ENTRY LOCATION

↓

412
COMPARE ENTRY VERSION INFORMATION ASSOCIATED WITH THE FIRST CATALOG WITH GAP VERSION INFORMATION ASSOCIATED WITH A CORRESPONDING SECOND CATALOG GAP LOCATION

↓

414
IF THE ENTRY VERSION INFORMATION ASSOCIATED WITH THE FIRST CATALOG ENTRY IS OLDER THAN THE GAP VERSION INFORMATION ASSOCIATED WITH A CORRESPONDING SECOND CATALOG GAP LOCATION, DELETE THE FIRST CATALOG ENTRY FROM THE FIRST CATALOG

416
COMBINE TOP AND BOTTOM GAP LOCATIONS ADJACENT TO THE DELETED FIRST CATALOG ENTRY TO CREATE A NEW GAP LOCATION

↓

418
UPDATE GAP VERSION INFORMATION ASSOCIATED WITH THE NEW GAP LOCATION BY

420
SELECTING A MAXIMUM OF GAP VERSION INFORMATION ASSOCIATED WITH THE TOP GAP LOCATION, GAP VERSION INFORMATION ASSOCIATED WITH THE BOTTOM GAP LOCATION AND THE ENTRY VERSION INFORMATION ASSOCIATED WITH THE DELETED FIRST CATALOG ENTRY

AND

422
INCREMENTING THE GAP VERSION INFORMATION ASSOCIATED WITH THE NEW GAP LOCATION

FIG. 11

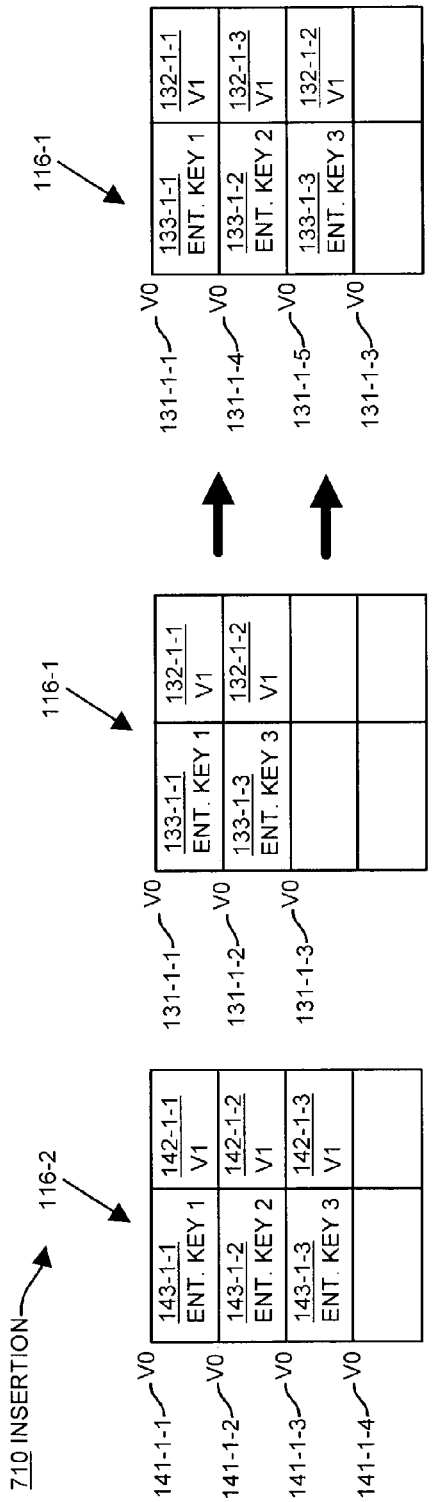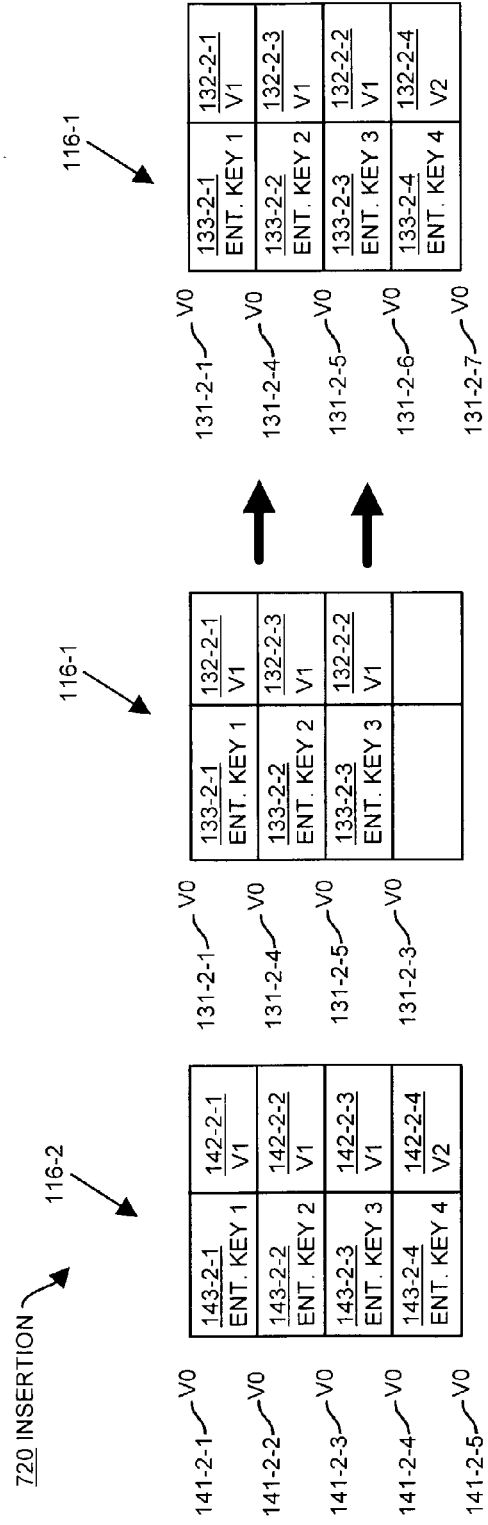
FIG. 15
FIG. 16

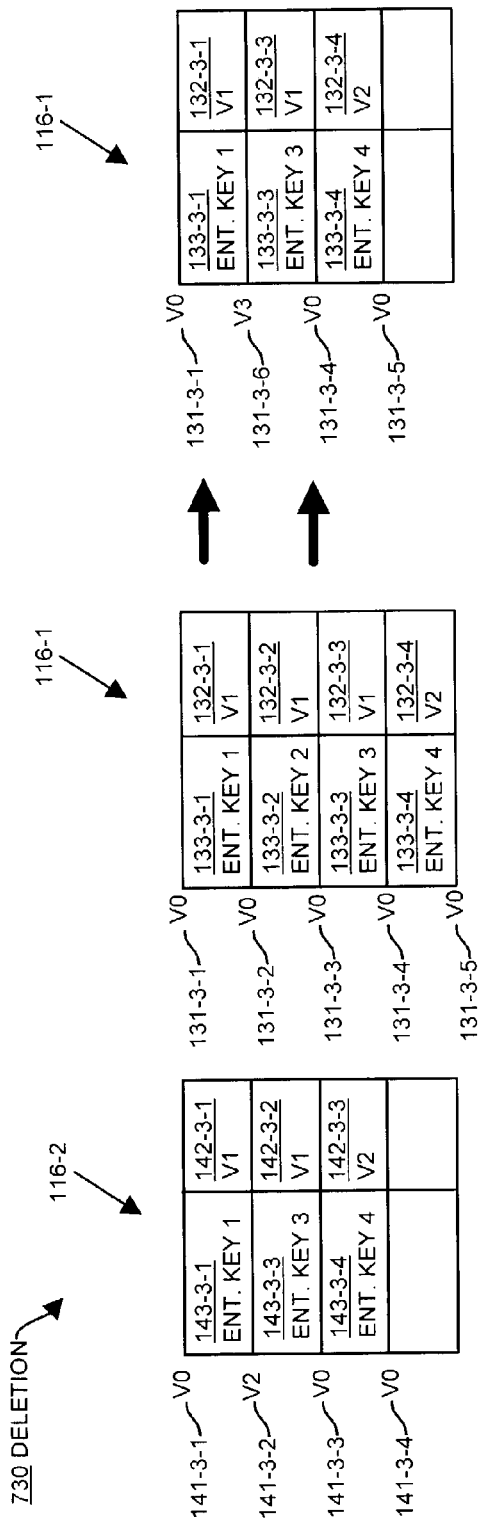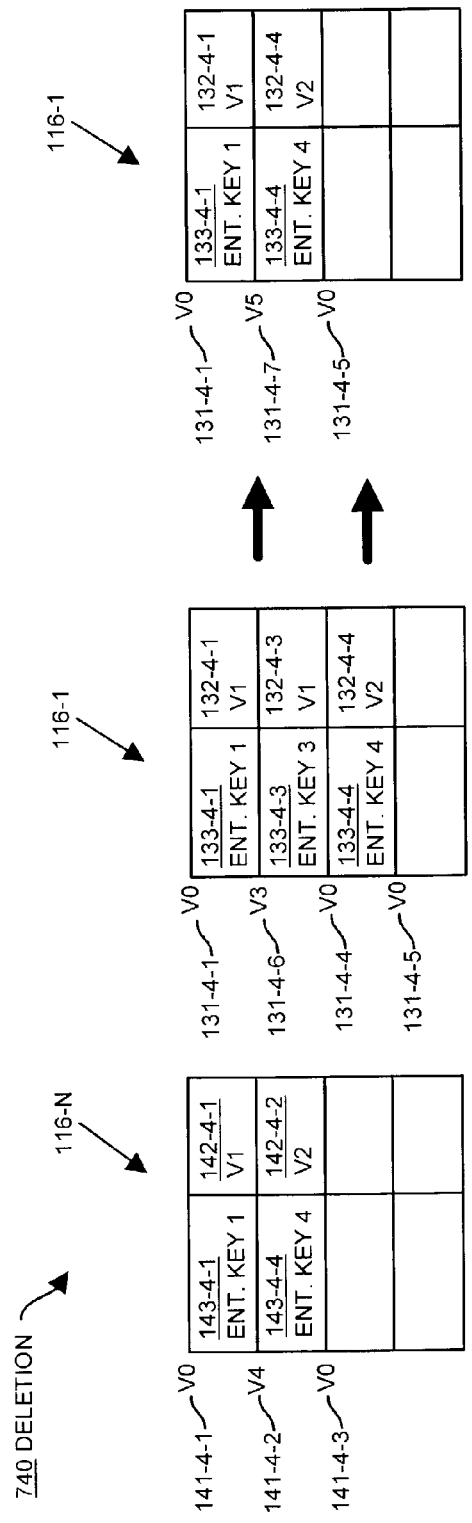

METHODS AND APPARATUS FOR REPLICATING A CATALOG IN A CONTENT DISTRIBUTION NETWORK

BACKGROUND OF THE INVENTION

Content distribution networks have come into widespread use as a mechanism for efficiently delivering different types of content over the Internet. They provide a way to maximize the speed and/or quantity of content that can be served in response to user requests. Content distribution networks employ multiple content distribution servers on which are stored content for delivery. In some cases, duplicates of content are stored on more than one content distribution server. The duplicate content locations allow for distribution of requested content from a convenient content distribution server (e.g. a close content distribution server, a content distribution server connected to a network route that has a high capacity, a content distribution server that has unused capacity during times of low traffic, etc.) for distribution of the content.

A content distribution manager coordinates multiple content distribution servers within the content distribution network. The content distribution manager redirects or arranges for the redirection of requests for content to appropriate content distribution servers that hold the content. Content distribution managers also perform functions related to the placement of the content on appropriate content distribution servers. Examples of such functions include analyzing, managing, and tracking the locations of content on the content distribution servers within the content distribution network, updating the content on the appropriate content distribution servers, etc.

The content distribution servers maintain individual directories of the content items stored and to be stored on the content distribution servers. Each content distribution server keeps its directory up-to-date. In some content distribution networks, a content distribution server updates its own directory by obtaining the complete up-to-date directory from another location. In other content distribution networks, the content distribution servers obtain updated information for only directory entries that have experienced changes. For example, in some cases, a content distribution server keeps its directory up-to-date by comparing the version numbers of entries within its directory to the versions numbers of entries known to be up-to-date in a directory from another location. If differences are observed in directory entries versions between the content distribution server and the directory of another content distribution server at the other location, the content distribution server obtains those differing directory entries that should be updated in the content distribution server's own directory.

If a content distribution server deletes an entry in the up-to-date directory, the content distribution server leaves a replacement entry called a "tombstone" in place of the deleted entry. The "tombstone" records the fact that an entry existed that is no longer needed. Other content distribution servers, in turn, use such tombstones as a basis for deleting the corresponding entries from their directories.

Content distribution servers obtain the content listed on their directories from various sources. Examples of such sources include other content distribution servers, the content distribution manager, content providers themselves, etc. For example, assume that a certain content server receives a new up-to-date directory that, for the first time, includes entries for content X, content Y, and content Z. Accordingly, since the content distribution manager holds a master copy of content X, the content distribution manager schedules a download to the content distribution server of content X. The content distribution manager may download content X during evening hours in order to take advantage of a low traffic load during that period. Content Y may be only available from a content provider. The content distribution server may obtain content Y from the content provider on the next day. Multiple content distribution servers in different locations may hold duplicate copies of Content Z. The content distribution server, therefore, may poll the content distribution servers in each of those locations to obtain content Z from the first of the locations with content Z that becomes available to provide the download. In this way the content distribution server obtains content designated for it in its updated directory.

SUMMARY OF THE INVENTION

There are shortcomings to the conventional methods for updating the directory of a content distribution server in a content distribution network. One of the conventional methods for maintaining an up-to-date directory is for a master content distribution manager or server to transmit a complete up-to-date directory that replaces the already-existing directory to the content distribution server. This method suffers from a variety of problems including consumption of bandwidth and speed reduction. If changes to the directory are small, transmission of complete directories will be particularly wasteful because the up-to-date directory entries are unnecessarily transmitted to content distribution servers along with the out-of-date directory entries. If a content distribution manager makes frequent small directory updates, the waste of transmission bandwidth attributable to transmission of already-up-to-date entries is even worse.

In the case of one alternative conventional method for maintaining up-to-date directory entries, the content distribution server obtains directory entry information for only the out-of-date directory entries rather than obtaining the complete directory with both out-of-date and up-to-date entries. This method does not require transmission of already up-to-date entries as would be transmitted by the method of transmitting a complete new directory.

Content distribution servers in certain conventional content distribution networks obtain directory information from a master content distribution manager or server. However, in other conventional content distribution networks, the task of providing such updates is shared with other devices. According to that configuration, the conventional content distribution server obtains updates either from a master content distribution manager or server or alternatively from another content distribution server.

In other conventional content distribution network configurations the content distribution server may obtain directory information from other content distribution servers that have already received the directory information. For example, in some conventional content distribution networks, the conventional content distribution servers obtain directory information from one or more of multiple content distribution managers operating in a content distribution network. Thus the conventional content distribution server can obtain updates to its directory from other content distribution servers if the master content distribution manager is out of service or otherwise not available.

The conventional content distribution server adds new directory entries, obtained from a master content distribution manager or server or another content distribution server, to the content distribution server directory and/or updates changed directory entries. When such a conventional master content distribution manager or server or other conventional content distribution server creates or updates new directory entries, the master content distribution manager or server or other content distribution server either updates or inserts the new or updated directory entries into its own directory. In that way the updated and/or inserted entries become accessible to update other content distribution servers.

However, if the conventional master content distribution manager or server or another content distribution server deletes an entry, the conventional master content distribution manager or server or another conventional content distribution server creates a tombstone for the deleted entry. Since each content distribution server has the option to update its directory from the other content distribution servers, the conventional content distribution servers maintain all of the tombstones needed to update content distribution servers at various stages of updated-ness.

Accordingly, every conventional content distribution server in the system needing information about a particular tombstone must be notified about the tombstone. As the number of conventional distribution servers grows, the computation to establish that every conventional distribution server has received needed information (e.g. tombstones) becomes progressively more expensive. In addition, as the system becomes larger, the likelihood decreases of actually having every conventional distribution server available (e.g. not out-of-service or otherwise unavailable), to participate in such a computation. As a result, it is difficult for the tombstone elimination process to keep up with the tombstone creation process in large-scale systems.

Finally, in large-scale systems, maintaining tombstones for deleted entries in the conventional master content distribution server and the conventional content distribution servers consumes storage and directory space.

Embodiments of the invention address techniques for maintaining up-to-date content distribution node catalogs (i.e., content directories) without the need to maintain tombstones to track deleted catalog entries. According to embodiments of this invention, the catalog of content (i.e., the list of content available) for a particular content distribution node (i.e., server within a content distribution network) is organized in a manner that allows the catalog to only require a minimum amount of storage space. In particular, the catalog is an ordered list of catalog entries. Thus if a particular portion of content is available to be served to clients from the content distribution network (i.e., from one or more of the content distribution nodes in the content distribution network), then the catalog maintained by those nodes in the content distribution network will have a catalog entry for this portion of content. Moreover, since the catalog is an ordered list, placement (e.g., addition or creation) of a catalog entry will always occur at a specific position within the catalog in relation to other catalog entries that already exist in the catalog. Each catalog entry has an associated version number. As will be explained, this version can be incremented according to embodiments of the invention to indicate what version of a particular portion of content is referenced by a specific catalog entry.

In addition to catalog entries that each have an associated version number, the catalog maintained by nodes in the content distribution network according to embodiments of the invention also includes the concept of "gaps." Generally, a gap in a catalog denotes or identifies a space or a position between two catalog entries. As an example, a single catalog entry for a portion of content will have an associated "top" or "upper" gap above this catalog entry as well as a "bottom" or "lower" gap. Note that a gap is not a catalog entry itself, but is merely a logical identifier of a boundary between two catalog entries. Each gap position also has an associated version number. To illustrate this concept, the following is a simple example of a catalog containing three catalog entries A, B and C, each with an associated version, and each having upper and lower (top and bottom) gap locations:

Gap 1→Gap Version
Catalog entry A, Entry Version
Gap 2→Gap Version
Catalog entry B, Entry Version
Gap 3→Gap Version
Catalog entry C, Entry Version
Gap 4→Gap Version Note that it is possible for the various gap versions to be different from each other as well as for entry versions to be different (e.g. different version numbers) from each other, just as the gap versions could also be different from entry versions. Note, also, that the bottom or lower gap location for one catalog entry is considered the top or upper gap location for the entry below that catalog entry. As an example, Gap 2 is the lower or bottom gap location for Catalog Entry A, and is also considered, for purposes of embodiments of this invention, to be the upper or top gap location for Catalog Entry B. As will be explained, embodiments of the invention use this catalog structure in conjunction with a version based comparison technique that utilizes version information (e.g., version numbers) associated with catalog entry and gap locations to accurately maintain the contents of catalogs within each content distribution node in the content distribution network. There is no need to maintain tombstones for deleted catalog entries and thus catalogs do not grow excessively even in the case of repeated catalog entry deletions. In place of tombstones, embodiments of the invention employ a unique gap consolidation technique that can accommodate repeated deletion of catalog entries and that adjusts or updates version numbers associated with catalog gap locations such that future references to positions within the catalog at locations of former deleted catalog entries will contain gap locations having version numbers that can be used to indicate or determine that catalog entries of specific versions were formerly present in the catalog, but were then subsequently deleted from the catalog. In this manner, embodiments of the invention are able to compare, for example, catalog structures from two different nodes, and are able to determine which catalog is more "up to date". Content distribution node catalogs can thus perform a version based catalog comparison technique to periodically obtain needed updates (e.g. insertion, deletion, update entry information) from other content distribution node catalogs. As an example, if during a comparison of two catalogs, an embodiment of the invention encounters a situation where one catalog has an entry at a specific catalog location (i.e., in the ordered list of the catalog) whereas another catalog contains no such entry, the version based comparison technique can determine if the catalog that does not contain the entry should receive or obtain a copy of the entry from the catalog that does contain the entry, or alternatively, the version based comparison technique can determine if the catalog that does contain the entry should delete the entry based on version information at a gap location within the catalog that does not contain the entry.

Generally then, embodiments of the invention allow a first content distribution node to compare either catalog entries or gap locations from a second catalog to corresponding catalog entries or gap locations from the first catalog. If differences exist, as will be explained, in corresponding catalog entries or gap locations, the first content distribution node identifies that a modification condition exists. That is, upon detection of a difference in catalog structure between two or more nodes, embodiments of the invention signal a modification condition that essentially indicates that one of the two catalogs is "out of date". The modification condition indicates that a version-based comparison of the catalog entries or gap locations should be undertaken and embodiments of the invention perform this version based comparison technique, as will be explained. In turn, based on the version-based comparison, the first content distribution node may identify a change condition requiring insertion, updating (i.e., of version information) or deletion of the corresponding first catalog entry. Additionally, in the case of deletions, the first content distribution node calculates new gap version information using a catalog entry deletion and corresponding gap condensing technique to properly assign a new version number to a remaining gap that exists where the deleted catalog entry formerly existed. The new gap version information provides new information for future comparisons between the first content distribution node and other content distribution nodes.

In one embodiment, the first content distribution node, to maintain a first catalog, detects a modification condition (e.g., any difference between catalog comparisons) associated with the first catalog of the first content distribution node. The modification condition identifies a potential requirement to modify the first catalog within the first content distribution node. In response to detecting the modification condition, the first content distribution node performs a version-based comparison technique on the first catalog based on the modification condition. The version-based comparison technique compares at least one of gap version information and entry version information associated with the modification condition to gap version information and entry version information associated with the first catalog to identify a catalog change condition. If the catalog change condition indicates a catalog modification is required to be made to the first catalog, the first content distribution node modifies the first catalog in accordance with the catalog change condition that is identified by the version-based comparison technique.

The modification condition identifies the need for changes to the first catalog such as catalog entry insertions, deletions or updates (e.g., adjustments to version information for a particular catalog entry). The version-based comparison, performed in response to detecting the modification condition, provides a mechanism for determining whether the catalog entry or gap location, for example, existing in the first catalog or the second catalog is more up-to-date. In turn, the first content distribution node makes appropriate modifications to its catalog entries including changes to catalog entries and to entry and gap version information. Entry version information and gap version information effectively record how up-to-date the first catalog entries and gap locations (i.e. representing either missing or deleted first catalog entries) are.

In another embodiment, the first content distribution node receives, from a master content distribution node, either an insert catalog entry command or a delete catalog entry command. Each of the insert and delete catalog entry commands indicates, to the first catalog of the first content distribution node, a respective insertion or deletion operation of a catalog entry. The first content distribution node uses insert and delete catalog entry commands to update the first catalog to the level of currency of the master content distribution node catalog entries. In turn, other content distribution nodes use the updated catalog entries to update their own catalogs.

In another embodiment, the first content distribution node compares a first catalog entry of the first catalog within the first content distribution node with a second catalog entry in a second catalog accessed from at least one second content distribution node. By performing the procedure, the first content distribution node identifies differences between the first and second catalogs thereby indicating a modification condition. The detected modification condition, in one example, identifies a difference between the first catalog of the first content distribution node and the second catalog of the second content distribution node where the second catalog entry corresponds to the first catalog entry. This allows one content distribution node to update itself from another content distribution node.

In another embodiment, the first content distribution node receives, from the second catalog, the second catalog entry. The second catalog entry includes the second catalog entry key. The second catalog entry key identifies a location of the second catalog entry in the second catalog. The first content distribution node searches the first catalog to locate the first catalog entry. The first content distribution node searches the first catalog with the second catalog entry key. If the first catalog entry is not found, the first content distribution node triggers the modification condition associated with the first catalog of the first content distribution node. By using second catalog entry key to discover whether a corresponding first catalog entry exists in the first catalog, the first content distribution node is able to determine if a modification condition exists thereby requiring further action by the first content distribution node.

In another embodiment, if the first catalog entry is found and if entry version information from the first catalog entry is different from entry version information from the second catalog entry, the first content distribution node triggers the modification condition. Thus the embodiment provides a mechanism for addressing the situation whereby a first catalog entry exists that corresponds to an existing second catalog entry but one of the two catalog entries is older than the other catalog entry.

In yet another embodiment, the first content distribution node provides the first catalog entry to the second catalog. The first content distribution node provides the first catalog entry in response to the step of receiving the second catalog entry. Accordingly, in this embodiment, one or more content distribution nodes send catalog entries to the first content distribution node and the first content distribution node provides first catalog entries in response. In turn, the first content distribution node compares the second catalog entry received and the first catalog entry provided in order to identify needed updates.

In yet another embodiment, the first content distribution node provides the first catalog entry. The first content distribution node compares the first catalog entry to a catalog gap that corresponds to the first catalog entry. The first content distribution node receives gap version information of the second catalog gap from the second catalog, in response to providing the first catalog entry. If the entry version information of the first catalog entry is older than the gap version information of the second catalog gap the first content distribution node triggers the modification condition associated with the first catalog of the first content distribution node. According to this embodiment, the first content distribution node compares a catalog entry from the first catalog to a gap location in the second catalog because the second catalog is missing the catalog entry corresponding the first catalog entry. The first content distribution node, by virtue of this comparison, determines whether the catalog entry should be kept or deleted.

In another embodiment, the first content distribution node repeats the step of comparing using different first catalog entries to identify any additional modification conditions. By conducting this repetitive process, the first content distribution node can assess the status and update its entire first catalog.

In another embodiment, the modification condition provides at least one of the following indications. One indication is that a second catalog associated with a second content distribution node contains a second catalog entry for which the first catalog of the first content distribution node does not contain a matching first catalog entry at a corresponding first catalog gap location. Another indication is that the first catalog associated with the first content distribution node contains a first catalog entry for which the second catalog associated with the second content distribution node does not contain a matching second catalog entry at a corresponding second catalog gap location. Another indication is that each of the first and second content distribution nodes contain corresponding catalog entries that have different associated entry version information. Accordingly, the indications identify all of the occasions which call for insertion or deletion of catalog entries into the first catalog of the first content distribution node as well as replacing older first catalog entries with newer catalog entries from the second content distribution node.

In still another embodiment, the first catalog comprises a set of catalog entries. Each catalog entry is capable of maintaining an identity of content to be distributed by the content distribution network as well as a first catalog entry key and respective entry version information. Each catalog entry includes at least one gap location having associated gap version information.

In yet another embodiment, the second catalog associated with the second content distribution node contains the second catalog entry for which the first catalog of the first content distribution node does not contain a matching first catalog entry at the corresponding first catalog gap location. The first content distribution node compares entry version information associated with the second catalog entry of the second catalog with gap version information associated with the corresponding first catalog gap location. If the entry version information associated with the second catalog entry is newer than the gap version information associated with the corresponding first catalog gap location, the first content distribution node duplicates the second catalog entry in the first catalog. The result of the comparison, as described, determines whether the second catalog entry will be inserted into the first catalog or not.

In yet another embodiment, the first content distribution node splits the corresponding first catalog gap location into a top first catalog gap location and a bottom first catalog gap location. The first content distribution node creates a new first catalog entry. Then the first content distribution node inserts a copy of the second catalog entry into the new first catalog entry. The copy of the second catalog entry includes the entry version information associated with the second catalog entry. By this procedure, the first content distribution node inserts a new first catalog entry into its proper location.

In still another embodiment, the first catalog associated with the first content distribution node contains the first catalog entry for which the second catalog of the second content distribution node does not contain a matching second catalog entry at the corresponding second catalog entry location. To perform a version-based comparison technique on the first catalog based on the modification condition, the first content distribution node compares entry version information associated with the first catalog with gap version information associated with a corresponding second catalog gap location. If the entry version information associated with the first catalog entry is older than the gap version information associated with a corresponding second catalog gap location the first content distribution node deletes the first catalog entry from the first catalog. This procedure provides the mechanism for the first content distribution node to delete a first catalog entry from the first catalog of the first content distribution node.

In still another embodiment, to delete the first catalog entry from the first catalog, the first content distribution node combines top and bottom first gap locations adjacent to the deleted first catalog entry to create a new gap location. Then the first content distribution node updates gap version information associated with the new gap location. In order to update the gap version information, the first content distribution node selects a maximum of gap version information associated with the top first gap location, gap version information associated with the bottom gap location and the entry version information associated with the deleted first catalog entry. The first content distribution node the increments the gap version information associated with the new gap location. By selecting the maximum of gap version information and incrementing the maximum of gap version information by one version, the first content distribution node creates version information that properly records the timing of the catalog entry deletion for possible future comparisons to second catalog entries.

In still another embodiment, to delete the first catalog entry from the first catalog, the first content distribution node creates a new gap location at the location of the deleted first catalog entry. The first catalog entry updates gap version information associated with the new gap location from the gap version information associated with the corresponding second catalog gap location. The first catalog entry combines, with the new gap location, a top gap location adjacent to the deleted first catalog entry having gap version information that is equivalent to the gap version information associated with the corresponding second catalog gap location. The first catalog entry also combines, with the new gap location, a bottom gap location adjacent to the deleted first catalog entry having gap version information that is equivalent to the gap version information associated with the corresponding second catalog gap location.

In yet another embodiment, to delete the first catalog entry from the first catalog, the first content distribution node receives, from the second catalog, the second catalog entry key from the second catalog entry above the corresponding second catalog gap location. The first content distribution node also receives, from the second catalog, the second catalog entry key from the second catalog entry below the corresponding second catalog gap location. If the second catalog entry key from the second catalog entry above the corresponding second catalog gap location matches the second catalog entry key from the second catalog entry below the corresponding second catalog gap location, the first content distribution node combines the top and bottom first gap locations adjacent to the deleted first catalog entry to create a new gap location.

In another embodiment, the modification condition is that each of the first and second content distribution nodes contains corresponding catalog entries that have different associated entry version information. To perform the version-based comparison technique on the first catalog based on the modification condition, the first content distribution node compares entry version information of the corresponding catalog entries of the first and second catalog. If the entry version information associated with a corresponding second catalog entry is newer than entry version information associated with the corresponding first catalog entry, the first content distribution node replaces the corresponding first catalog entry with the corresponding second catalog entry. By execution of this procedure, the first content distribution node updates a first catalog entry based on the existence of a more recent second catalog entry.

In another embodiment, a content distribution node inserts a catalog entry into a catalog of the content distribution node. To insert the catalog entry into the catalog of the content distribution node, the content distribution node finds an entry location for insertion of a catalog entry. At the entry location, the content distribution node splits a gap location into top and bottom gap locations. Then the content distribution node inserts the catalog entry into the catalog between the top and bottom gap locations. By this procedure the first content distribution node makes content distribution node catalog entries available to later update other content distribution nodes.

In still another embodiment, to delete a catalog entry from a catalog of the content distribution node, the content distribution node deletes the catalog entry. The content distribution node consolidates the top and bottom gap locations adjacent to the deleted catalog entry to create a new gap location. Then the content distribution node updates gap version information associated with the new gap location by selecting a maximum gap version information associated with the top first gap location, gap version information associated with the bottom gap location and entry version information associated with the deleted catalog entry. By selecting the maximum of gap version information, as described, the content distribution node creates version information that properly records the timing of the catalog entry deletion for possible future comparison to second catalog entries.

Other embodiments of the invention include a computer system, such as a data communications device, computerized device, or other device configured with software and/or circuitry to process and perform all of the method operations noted above and disclosed herein as embodiments of the invention. In such embodiments, the device, such as a data communications device, comprises one or more communications interfaces (e.g., network interfaces), a memory (e.g., any type of computer readable medium, storage or memory system), a processor and an interconnection mechanism connecting the communications interface, the processor and the memory. In such embodiments, the memory system is encoded with a catalog maintainer application that when performed on the processor, produces a catalog maintainer process that causes the computer system to perform any and/or all of the method embodiments, steps and operations explained herein as embodiments of the invention. In other words, a computer, switch, router or other device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. As an example, a data communications device software control application, such as a data communications device operating system configured to operate as explained herein is considered an embodiment of the invention. More particularly, a computer program product is disclosed which has a computer-readable medium including computer program logic encoded thereon that, when executed on at least one processor of a computerized device, causes the processor to perform the operations (e.g., the methods) indicated herein as embodiments of the invention. Such arrangements of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other device to cause such a device to perform the techniques explained herein as embodiments of the invention.

Embodiments of the invention also include computer program products such as disks or other readable media that have a computer-readable medium including computer program logic encoded thereon for maintaining a catalog within a content distribution network in a networked computer environment, such that the computer program logic, when executed on at least one processing unit with the computerized device, causes the at least one processing unit to perform any or all of the aforementioned methods.

The methods embodiments of the invention may be implemented by computer software and/or hardware mechanisms within a data communications device apparatus. It is to be understood that the system of the invention can be embodied strictly as a software program, as software and hardware, or as hardware alone. The features of the invention, as explained herein, may be employed in data communications devices and other computerized devices and software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 8 is a flow chart providing details of the procedure for indicating the modification condition according to one embodiment of the invention.

FIG. 11 is a flow chart providing additional details of the procedure for indicating the modification condition according to one embodiment of the invention.

FIG. 15 shows an example insertion of the catalog entry into the catalog of the content distribution node according to one embodiment of the invention.

FIG. 16 shows an additional example insertion of a catalog entry into the catalog of the content distribution node according to one embodiment of the invention.

FIG. 17 shows an example deletion of a catalog entry from the catalog of a content distribution node according to one embodiment of the invention.

FIG. 18 shows an additional example deletion of a catalog entry from the catalog of the content distribution node according to one embodiment of the invention.

DETAILED DESCRIPTION

The invention addresses techniques for maintaining up-to-date content distribution node catalogs without the need to maintain tombstones to track deleted catalog entries. Thus catalogs do not grow excessively. Content distribution nodes can obtain needed update information (e.g. catalog entry insertion, deletion, update information) from other content distribution node catalogs. Prior to referencing this detailed description, the reader is referred to the Summary of the Invention section above for a brief explanation of the structure of the catalogs maintained by content distribution nodes (e.g., content servers) within a content distribution network equipped with embodiments of this invention. In one embodiment of the invention, a first content distribution node compares either catalog entries or gaps locations with the corresponding catalog entries or gap locations from a second catalog. If differences exist in corresponding catalog entries or gap locations (or version information associated with such entries or gap locations), the first content distribution node identifies that a modification condition exists. The modification condition indicates that a version-based comparison of the catalog entries or gap locations should be undertaken. Processing of the version based comparison technique is able to determine, based on version information associated with catalog entry and/or gap locations, which catalog contains the more up to date information. In turn, based on the version-based comparison, the first content distribution node either inserts, updates or deletes the corresponding first catalog entry. Additionally, in the case of deletions, the first content distribution node calculates new gap version information. The new gap version information provides information for future comparisons between the first content distribution node and other content distribution nodes. Further details of specific embodiments of the invention will now be provided with reference to the FIGS. 1–19.

Figure 1:
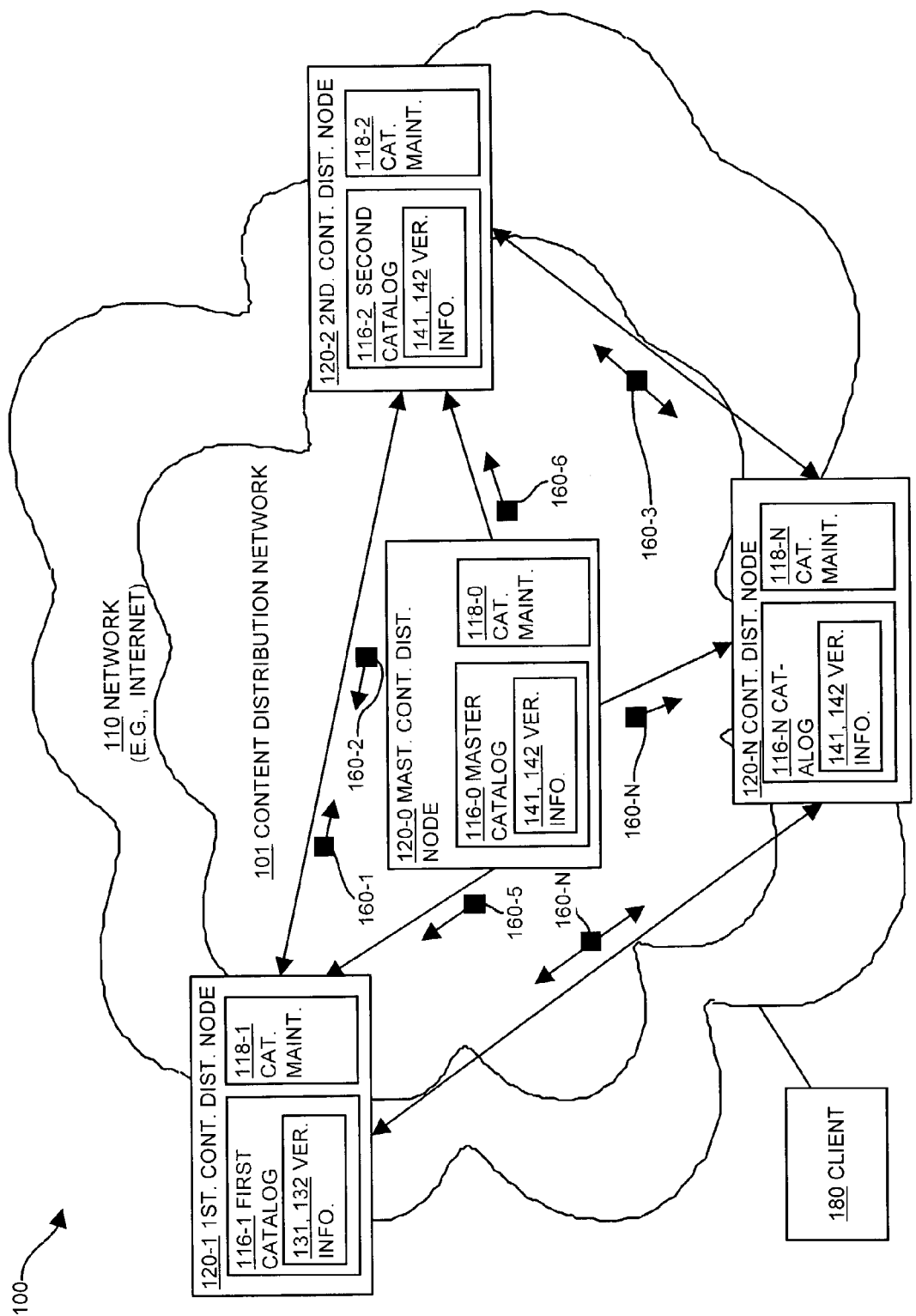
FIG. 1 is a system 100 for maintaining a catalog of a content distribution node according to one embodiment of the invention.

FIG. 1 is a system 100 for maintaining a catalog of a content distribution node according to one embodiment of the invention. The system includes multiple content distribution nodes 120-0, 120-1, 120-2, 120-N (e.g. of which one is the master content distribution node 120-0, another is the first content distribution node 120-1 and another is the second content distribution node 120-2). The master content distribution node 120-0 in certain configurations may distribute content, but in other configurations may not distribute content. For example, in certain configurations, the master content distribution node 120-0 may concentration of the function of providing entry information to the various first, second, and other content distribution nodes 120-1, 120-2, 120-N.

The content distribution nodes 120 operate in conjunction with one another as a content distribution network 101, disbursing content among the various content distribution nodes 120 for distribution to clients 180 requesting the content. The content distribution nodes 120 communicate with each other via a network 110 such as the Internet.

Each of the content distribution nodes 120-0, 120-1, 120-2, 120-N has a catalog 116 (of which the catalog 116 in the master content distribution node 120-0 is referred to as the master catalog 116-0, the catalog 116 in the first content distribution node 120-1 is referred to as the first catalog 116-1, and the catalog 116 in the second content distribution node 120-2 is referred to as the second catalog 116-2 and so forth). Note that there may be more or less than four content distribution nodes 120 within a content distribution network 101 configured to operate according to embodiments of the invention. The catalogs 116 serve as a list of the content items stored on each of the respective content nodes 120. In effect, the catalogs 116 identify content items contained on and servable to clients 180 from the content distribution node 120, as well as content items for which the content must be loaded onto or deleted from the content distribution node 120.

Other configurations are also possible. For example, in one such configuration, a content distribution node 120 has multiple independent catalogs 116 that operate independently. In certain configurations also, the multiple catalogs 116 may operate in conjunction with various combinations of multiple master content distribution nodes 120-0. In one case, for example, different providers control different catalogs 116. In a different example, a particular catalog 116 works in conjunction with a particular set of content distribution nodes 120.

The content distribution nodes 120-0, 120-1, 120-2, 120-N contain catalog entry version information 132, 142 and gap version information 131, 141. Details of example catalogs will be referenced and explained in later figures. Generally however, the content distribution nodes 120 compare the entry and gap version information 132, 142, 131, 141 from one catalog 116-N with entry and gap version information 132, 142, 131, 141 from another catalog 116-N in order to determine which catalog 116-N is more up-to-date. Detected difference trigger a modification condition and performance of a version based comparison technique on the two or more differing catalogs 116. Based on the outcome of the version based comparison technique performed by the catalog maintainer 118 in each node, the content distribution nodes 120 then update the out-of-date catalogs 116 accordingly. Each content distribution node 120 has a catalog maintainer 118-0, 118-1, 118-2, 118-N for processing its catalog 116.

By maintaining and performing comparisons of the entry and gap version information 132, 142, 131, 141 between different catalogs 116, the content distribution nodes 120 limit growth of catalog 116-N. Both transmission bandwidth and storage requirements for the catalogs 116 of the content distribution nodes 120 are thereby limited, as well.

In one example embodiment, all catalog entries 160 held in content distribution nodes 120 originate from the master content distribution node 120-0. However, once a master content distribution node 120-0 has distributed an update to at least one content distribution node 120, such updates can continue to be disbursed to other content distribution nodes 120 using the catalog update techniques described herein. In that way it is possible for content distribution nodes 120 to be updated even if the master content distribution node 120-0 goes out-of-service. The ability to maintain multiple content distribution node 120 catalogs 116 that can be updated from one another instead of requiring simultaneous access to one or more master nodes 120 is particularly valuable. It would otherwise be difficult for a large number of content distribution nodes 120 to access catalog entries 160 from a central source. Accordingly, each node 120 can operate a catalog maintainer (e.g., process and/or hardware or circuitry) to perform according to embodiments of the invention to continuously or periodically compare and contrast its respective catalog 116 with one or more other catalogs 116 or other nodes 120 in order to propagate a change put forth by the master catalog maintainer 118-0 to or more of the other nodes 120. In other words, once a change is made by the master node 120 to a catalog 116-1 through 116-N of one of the other nodes 120, other nodes 120 that do not specifically receive such a catalog update (e.g., 160-5) from the master node 120-0 can still automatically and dynamically update their catalogs using the techniques explained herein that involve the version based comparison techniques. Prior to discussing details of such techniques, further details of the structure of a catalog 116 will now be presented to assist in understanding more detailed concepts presented thereafter.

Figure 2:
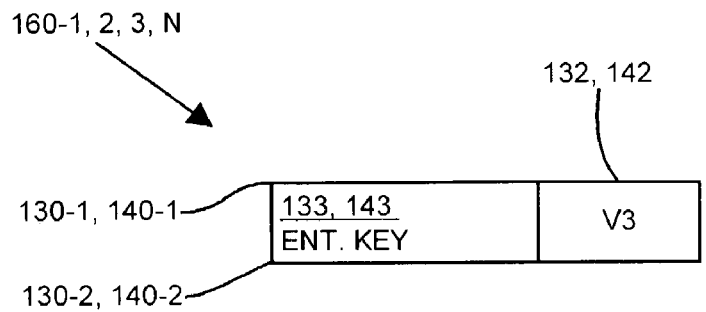
FIG. 2 depicts an example of a catalog entry according to one embodiment of the invention.

FIG. 2 depicts an example of a single catalog entry 160 according to one embodiment of the invention.

The catalog entry 160-1, 160-2, 160-3, 160-N (e.g. first catalog entry 160-1, second catalog entry 160-2, or another catalog entry 160-N) has an entry key 133, 143 (e.g. a first catalog entry key 133, master or second catalog entry key 143, etc.). In one embodiment, the entry key 133, 143 is an indexed key that is capable of finding and/or identifying the catalog entry 160-N. Other embodiments include URL's or other identifiers used to locate and/or identify catalog entries 160, etc. Catalog entries 160 may include other data fields, as well, such as, for example, file names, sizes, or other descriptive characteristics associated with a portion of content to which they refer. Catalog entry keys 133, 143 and data fields may be configured to perform the dual functions of storing data (i.e., via a reference such as a URL to data storage in a manner that is easily accessible to a content distribution node 120 for serving to clients 180) and serving as the catalog entry key 133, 143. In other words, a catalog entry 160 can contain, for example, a URL or other content identifier that references content or data to be served to clients 180 via nodes 120 in the content distribution network 101, and this information can also serve as a key. As another example, in such a configuration, the file name is used as a data field to identify a media file. At the same time, the file name provides the basis for the indexed catalog entry key 133, 143, used to locate and/or access a catalog entry 160-N from among all of the catalog entries 160 in the catalog 116.

The catalog entry 160-N also has entry version information 132, 142 (e.g. such as entry version information 132 of the first catalog, entry version information 142 of the master and second catalog, etc.). In one embodiment, the version information 132, 142 identifies the age of catalog entries 160 and adjacent gap locations 130 relative to one another. For example, a catalog entry 160-N having version information 132, 142 having a numerical value of "1" is generally considered to be an older version of the catalog entry 160-N than a catalog entry 160-N having version information 132, 142 that has a numerical value of "2" or another higher number. Thus higher version numbers indicate newer version of content, or newer versions of a gap location. Content distribution nodes 120 compare the version information 132, 142 numbers of catalog entries 160 and/or gap locations 130, 140 to determine the relative ages in order to identify which of two catalog entries 160 or gap locations 130, 140 with two different versions information 132, 142 numbers should be replaced. Other alternatives numbering schemes may also be used to identify version information 132, 142 such as dates or other naming schemes. In one such example, the version is a compound naming and/or numbering scheme that is a composite of several input values.

Figure 4:
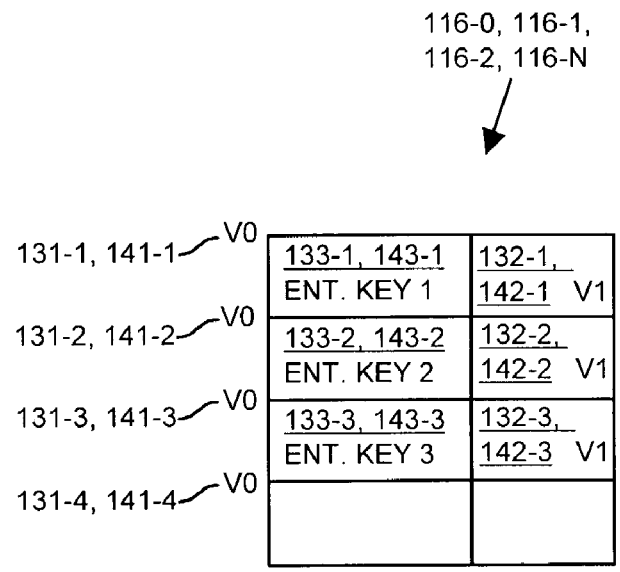
FIG. 4 depicts an example of a catalog of a content distribution node according to one embodiment of the invention.

A catalog entry 160-N also has two gap locations 130, 140 for each catalog entry 160-N (e.g. such as a top first gap location 130-1 and bottom first gap location 130-2 of the first catalog entry 160-1, or a top first gap location 140-1 and a bottom gap location 140-2 of the second catalog entry 160-2). Gap locations 130, 140 have respective gap version information 131, 141. Such gap version information 131, 141 is depicted in FIG. 4 as well. Lower gap versions indicate older gap locations.

Figure 3:
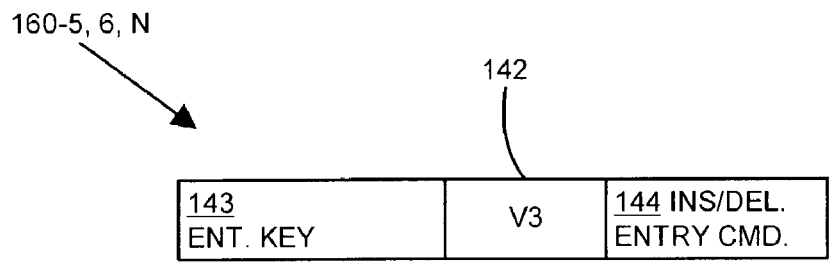
FIG. 3 depicts an example of a catalog entry having an insertion/deletion command according to one embodiment of the invention.

FIG. 3 depicts an example of a catalog entry 160 associated with an insert/delete entry command 144 according to one embodiment of the invention. In other words, the entry 160 in FIG. 3 may be a command sent, for example, from the master node 120-0 to one of the other content distribution nodes 120-1 through 120-N that instructs that/those node(s) to insert or delete a particular catalog entry.

As shown in the figure, the catalog entry 160-5, 160-6, 160-N has an entry key 143 (e.g. master catalog entry key) that is equivalent to the entry key 143 for the catalog entry 160 as depicted in FIG. 2. The catalog entry 160-5, 160-6 or 160-N also has entry version information 142 equivalent to the entry version information 132, 142 of the catalog entry 160 as depicted in FIG. 2. In addition to the entry key 143 and entry version information 142, the catalog entry 160-5, 160-6 or 160-N has an insert or delete entry command 144 indicating if the entry is to be inserted or deleted from the catalog 116.

FIG. 4 depicts a fairly simple example of a catalog 116-0, 116-1, 116-2 and 116-N of a content distribution node 160 according to one embodiment of the invention.

The example catalog 116-0, 116-1, 116-2 or 116-N contains multiple entry keys 133, 143, and multiple entry version information 131, 141. In addition, FIG. 4 depicts multiple instances of gap version information 131-1, 131-2, 131-3, 131-4, 141-1, 141-2, 141-3, 141-4 (i.e. 131-1, 131-2, 131-3, 131-4 represent entry version information of the first content distribution node catalog, and 141-1, 141-2, 141-3, 141-4 represent entry version information of the master, second or other content distribution node catalogs) associated with each gap location 130 of the entry keys 133, 143.

Other arrangements of the catalog 116-0, 116-1, 116-2 or 116-N entry keys 133, 143 and gaps 130, 140 are possible which provide the functionality described herein. In one such arrangement, for example, each catalog entry 160 includes an entry such as an entry key 133, 143 (e.g. and/or other data fields) and a gap (e.g. a "gap after" part) 130, 140 (e.g. with gap version 131, 141 information). In addition, such a catalog 116 includes an additional gap 130, 140 such as a "first" gap. With such an arrangement, every insertion/deletion of a catalog entry 160 preserves the correct interleaving of catalog entries 160 and gaps 130, 140, at the same time ensuring that an empty table contains a single gap.

The content distribution node 120-N stores catalog entries 160 within the catalog 116-N in a manner that permits access to the catalog entries 160 and identifies a relative order between the catalog entries 160. Maintaining relative order between the catalog entries 160 permits identification of gap locations 130 with respect to specific catalog entries 160.

Figure 5:
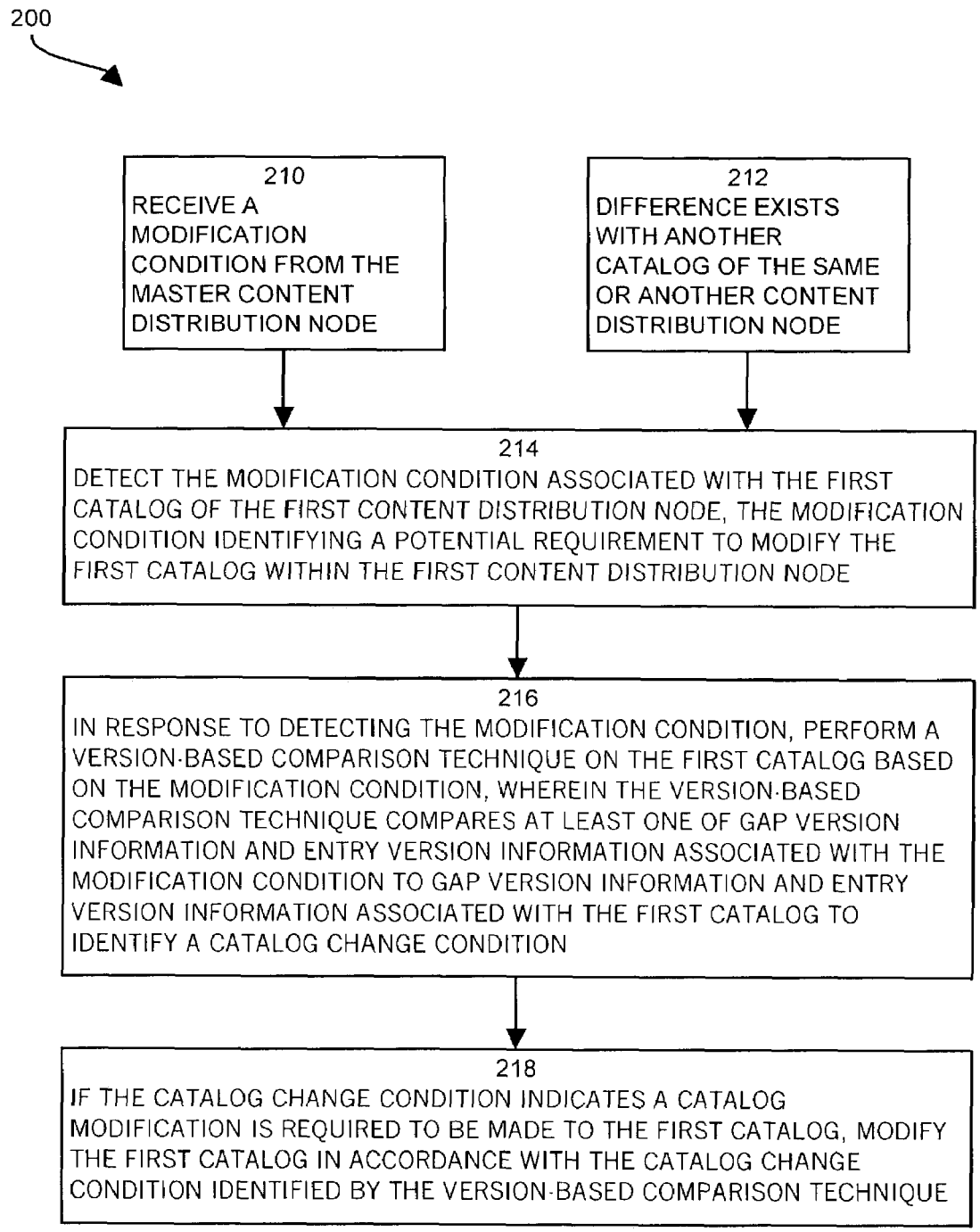
FIG. 5 is as flow chart of a procedure for maintaining a catalog of a content distribution node according to one embodiment of the invention.

For example, with respect to such a relative order or proximity, a spatial orientation provides for the identification of one or more gap locations 130, 140 with respect to "nearby" catalog entries 160. In other words, for example, catalog entries 160 stored in a catalog 116 in locations one and five allow for the possibility of up to three gap locations 130, 140 (i.e. gap locations 2, 3, 4) to exist in the locations adjacent to those catalog entries 160 (i.e. catalog entries 160 stored at locations 1 and 5) assuming catalog entries existed (i.e., are not deleted) between locations one and five. Content distribution nodes use different methods for accessing catalog entry 160 and gap location 130, 140 information including accessing the catalog entries 160 by indexing the catalog, maintaining catalog entries 160 in an ordered list, sequential searching, etc. Since the catalogs 116 are ordered based on catalog entries (e.g., based on indexing their respective entry keys 143), when an entry 160 such as that in FIG. 3 is received that instructs a catalog maintainer 118 to insert the entry 160 into the local catalog 116 (i.e., the catalog maintained by the catalog maintainer 118), the catalog maintainer 118 can traverse the catalog 116 according to the existing order of entries 160 to determine a location in the catalog 116 at which to insert the new entry 160. FIG. 5 is as flowchart of a procedure for maintaining a catalog of a content distribution node according to one embodiment of the invention.

Steps 210 and 212 illustrate two operations of embodiments of the invention that can trigger the existence of a modification condition. In step 210, the first content distribution node 120-1 receives a modification condition from the master content distribution node 120-0. In this embodiment, the master content distribution node 120-0 is the primary source of catalog entries 160 (i.e., originates all changes or updates) used by the content distribution nodes 120 in the content distribution network 101. The master content distribution node 120-0 initiates changes in the catalog entries 160 maintained by one or more of the content distribution nodes 120. Once the master content distribution node 120-0 has initiated such a change to a catalog entry 160 (e.g., an insertion of a new entry, a deletion of an old entry, or an update to a version of an existing entry), content distribution nodes 120 that have not received the changes can obtain them from other content distribution nodes 120 that have themselves received catalog entry 160 changes.

In step 212, another operation that embodiments of the invention can perform is to detect a difference that exists with another catalog 116 of the same or another content distribution node 120. In other words, in addition to the master node 120-0 providing updates to the catalog, the catalog maintainer 118 in each node can perform step 212 (e.g., either periodically or continuously to constantly compare catalog information with other nodes 120, including the master node 120-0) in order to identify the needed change in a catalog. That is, the content distribution node 120-1 can compare two catalogs 116 to detect any differences. In one situation, for example, the first content distribution node 120-1 identifies a difference between a catalog entry 160-1 in the first catalog 116-1 and the corresponding catalog entry 160-2 from the second catalog 116-2 (e.g., from another node). In one situation such differences exist between catalogs 116 of two different content distribution nodes 120. To allow each node 120 to view and access catalog information 116 from other nodes 120, each node can export the file or database containing the catalog 116.

In step 214, the first content distribution node 120-1 detects a modification condition associated with the first catalog 116-1 of the first content distribution node 120-1. The modification condition identifies a potential requirement to modify the first catalog 116-1 within the first content distribution node 120-1.

For example, the content distribution node 120-1 receives a second catalog entry 160-2 from the second content distribution node 120-2. Comparison of the second catalog entry 160-2 to the catalog entries 160-1 in the first content distribution node 120-1 identifies that there is no corresponding catalog entry 160-1 to the received second catalog entry 160-2 within the first catalog 116-1. The first content distribution node 120-1 detects such a difference between the first catalog 116-1 and the second catalog 116-2 and thus defines a modification condition associated with the first catalog 116-1.

In step 216, in response to detecting the modification condition, the first content distribution node 120-1 performs a version-based comparison technique on the first catalog 116-1. The version-based comparison technique is based on the modification condition. The version-based comparison technique compares at least one of gap version information 141 and entry version information 142 associated with the modification condition to gap version information 131 and entry version information 132 associated with the first catalog 116-1. The version-based comparison technique identifies a catalog change condition.

By way of example, in one situation, the first content distribution node 120-1 finds no catalog entry 160-1 in the first catalog 116-1 that corresponds to the catalog entry 160-2 from the second catalog 116-2. Therefore, when performing the version based comparison technique, the first content distribution node 120-1 compares entry version information 142 of the catalog entry 160-2 (i.e. of the second catalog 116-2 that contained an existing entry) to gap version information 131 of the gap location 130 in the first catalog 116-1 (i.e. gap version information 131 of the gap location 130 that corresponds to a position of the catalog entry 116-2 of the second catalog 116-2). In other words, the version based comparison technique compares the version of the gap at the location where the catalog entry would have existed, had that catalog contained the entry that exists in the other catalog, with the version of the catalog entry from the catalog that actually contains the entry at that gap location. The first content distribution node 120-1 determines if, for example, the gap version information 131 of the catalog entry 160-1 of the first catalog 116-1, as described above, is newer than the entry version information 142 of the catalog entry 160-2 received from the second catalog 116-2. If so, the catalog maintainer 118-1, operating on behalf of the first content distribution node 120-1, determines that a change condition exists. In this case, a new catalog entry 160-1 will be deleted from the first catalog 116-1. In other words, in comparing two catalogs, if a catalog entry version of a catalog entry in one catalog is older than a gap version of a gap location existing at a position in the other catalog where that catalog entry would exist if it were to be inserted, then the change condition produced by the version based comparison technique indicates that the existing catalog entry should be deleted from the catalog containing that entry (as opposed to inserting the entry into the catalog that does not contain the entry but instead contains a higher version numbered gap). However, if a catalog entry version of a catalog entry in one catalog is newer than a gap version of a gap location existing at a position in the other catalog where that catalog entry would exist if it were to be inserted, then the change condition produced by the version based comparison technique indicates that the existing catalog entry should be inserted or copied from the catalog containing that entry into the position of the gap in the catalog that did not contain the entry.

It should be understood that, as described earlier, a catalog 116-N receives updated information (e.g. catalog entries 160 or gap location 130, 140 version information 132, 142, 131 or 141 that instigates changes in a catalog 120) from multiple alternative sources (e.g. multiple alternative content distribution nodes 160). In the example presented, the first content distribution node 120-1 either deleted or inserted a catalog entry 160-1 in the first catalog 116-1 as a result of updated information received from the second catalog 160-2 or received from another catalog 160-N. It should be noted that the master content distribution node 120-0 initiates changes to the system 100. The changes propagate through multiple paths (i.e. multiple content distribution nodes 120) originating from the master content distribution node 120-0 (e.g. not from content distribution nodes 120 operating independently).

Another example can illustrate how content distribution nodes 120 can receive updated information (e.g. catalog entry 160 or gap location 130, 140 version information that instigate changes in a catalog 116) from multiple sources (e.g. various content distribution nodes 120).

In this example, assume that the master content distribution node 120-0 sends update information to the first content distribution node 120-1 that results in changes to the first catalog 116-1 of the first content distribution node 120-1. In turn, the first content distribution node 120-1 forwards the same update information to the second content distribution node 120-2 that results in the same changes to the second catalog 116-2 of the second content distribution node 120-2. At a later time, either of the master content distribution node 120-0, the first content distribution node 120-1 or the second content distribution node 120-2 could forward the same update information to another content distribution node 120-N to initiate the same changes. Alternatively, instead of a node 120 forwarding update information, nodes 120 in the content distribution network 101 may be equipped to actively review the catalogs 116 of certain other nodes in order to detect changes to catalogs 116.

In one example of an alternative arrangement, a content distribution node 120 randomly requests samples of other content distribution node 120 catalogs 116 as an occasional background task. If any mismatches are detected, the content distribution node 120 undertakes a more extensive reconciliation.

In step 218, if the catalog 116 change condition indicates a catalog 116 modification is required to be made to the first catalog 116-1, the first content distribution node 120-1 modifies the first catalog 116-1 in accordance with the catalog 116 change condition identified by the version-based comparison technique.

For example, in one situation the first content distribution node 120-1 identifies that certain gap location 130 version information 131 in a first catalog 116 is older than the entry version information of a corresponding second catalog entry 160-2. The first content distribution node 121-1 thereby identifies the need to insert a copy of the second catalog entry 160-2 into the first catalog 120-1. In an alternative as explained above, a node 120 (i.e., the catalog maintainer 118 operating according to these processing steps) may determine that a particular catalog entry is out of date (i.e., has an older version) that a corresponding gap location in another catalog, and may thus delete its entry. In yet another alternative, if two catalogs 116 each contain an entry at the same location that references the same content (e.g., each contain the same URL) but the version numbers are different, then the version based comparison technique may produce a change condition that indicates that the version number of the older versioned entry should be updated to reflect the newer version number.

Figure 6:
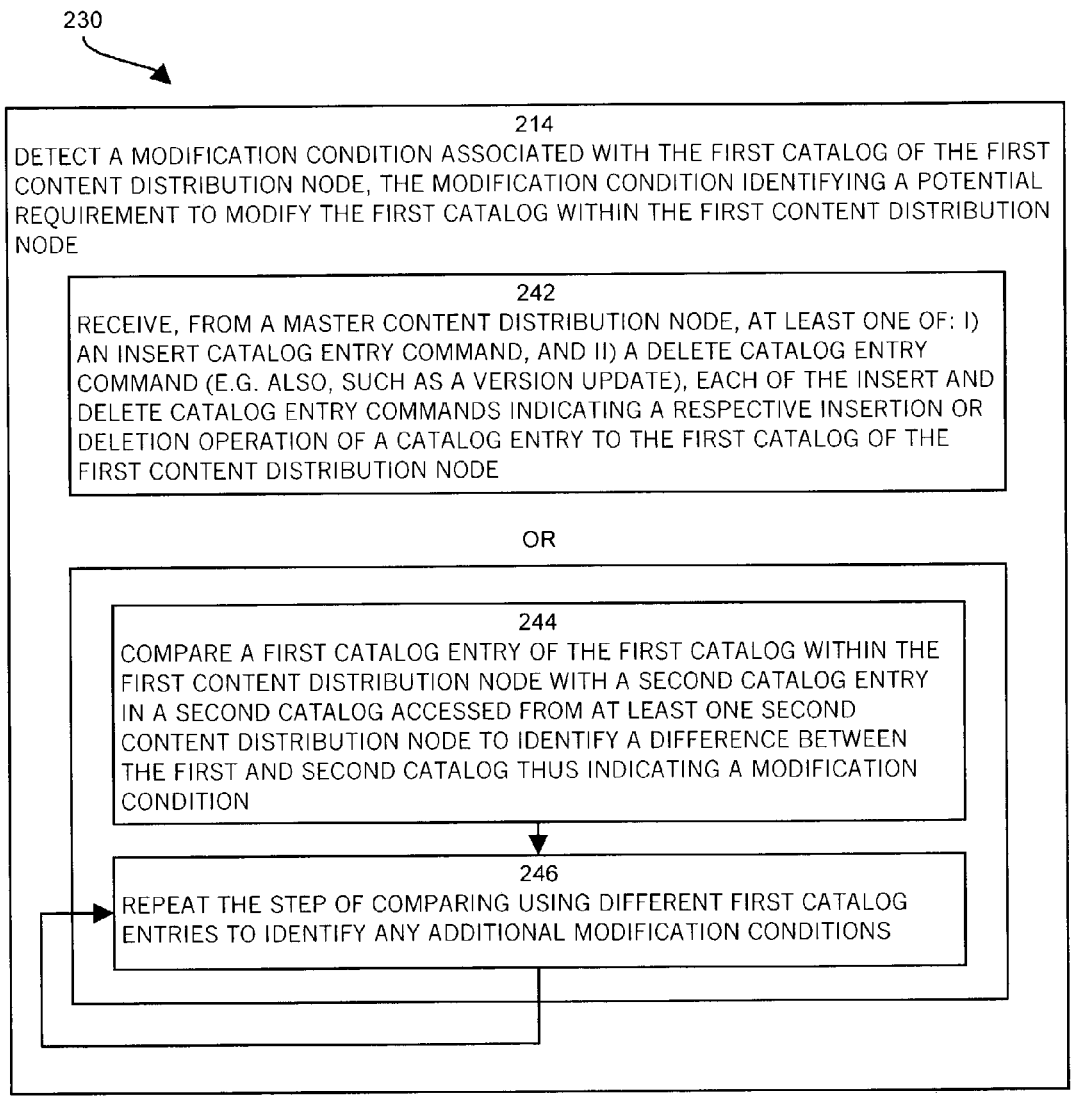
FIG. 6 is a flow chart of a procedure for detecting a modification condition associated with a first catalog of a first content distribution node.

FIG. 6 is a flow chart of a procedure for detecting a modification condition associated with the first catalog of the first content distribution node 120-1.

In step 214, the first content distribution node 120-1 detects a modification condition associated with the first catalog 116-1 of the first content distribution node 120-1, the modification condition identifying a potential requirement to modify the first catalog 116-1 within the first content distribution node 120-1. Step 214 was described earlier with respect to FIG. 5. Steps 242 through 246 that follow describe additional details of the procedure.

In step 242, the first content distribution node 120-1 receives, from a master content distribution node 120-0, at least one of: i) an insert catalog entry command 160-5, 160-6 or 160-N and/or ii) a delete catalog entry command 160-5, 160-6 or 160-N. Each of the insert and delete catalog entry commands 160-5, 160-6 or 160-N indicate a respective insertion or deletion operation of a catalog entry 160 to the first catalog 116-1 of the first content distribution node 120-1. Alternatively, a version number update command could be received in step 242 that indicates that only the version number of a particular catalog entry is to be updated to a newer version number.

The master content distribution node 120-0 is the primary or originating source for catalog entry 160 and gap location 140 information. The master content distribution node 120-0 maintains the catalog entries 160, entry version information 142 and gap version information 141 in a master catalog 116-0. As an example, as new content is added to the content distribution network and is available to clients 180 to obtain, once the master catalog 116-0 is updated to contain a catalog entry for this new content, the master node 120 can, for example, either send a catalog entry insert command 160-5 (FIG. 1) to at least one other node 120-1 through 120-N to force that node to update its catalog to reference this content, or alternatively, embodiments of the invention can rely on periodic or continuous node operations of catalog comparisons in which other nodes 120-1 through 120-N detect the update to the master catalog 116-0 and thus trigger the version based comparison technique to create a catalog change condition that causes insertion of this new entry into their respective catalogs. In turn, other catalogs 116 can obtain updates either directly from the master catalog 116-0 or indirectly from other catalogs 116 that received updates from the master content distribution node 120-0 master catalog 116-0. In this way, once one catalog is updated with a newer version of either a gap location of a new catalog entry (or a new version of an existing entry), the catalog maintainers 118 operating to continually maintain other catalogs 116 in the other nodes 120 will pick up or otherwise detect this update shortly thereafter.

Thus any change to a catalog made by the master node 120-0 will, after a short amount of processing time, be effectuated or propagated to all other nodes 120. The amount of time this takes for all catalogs to become synchronized in this manner is dependent upon such factors as the data communications bandwidth between nodes, the processing speeds of each node, the amount of update information required to be copied to a node, the size of the catalogs, and other factors. Note that since embodiments of the invention do not require keeping tombstones or other markers at locations of each deleted entry in each catalog 116, the catalogs only need to remain at the size of the number of entries for content that they each contain.

In one alternative embodiment, since the master catalog 116-0 always has the most up-to-date catalog entries 160, entry version information 142 and gap version information 141, the catalog entries 160-5, 160-6 or 160-N provided by or maintained by the catalog maintainer 118-0 within the master catalog 116-0 include an insertion or deletion entry command 144. In this embodiment then, the insertion or deletion entry command 144 notifies the catalog 116 that receives catalog entries 160-5, 160-6 or 160-N from the master content distribution node 120-0 master catalog 116-0 that version comparisons between two different catalogs 116 are unnecessary. Accordingly catalog entries 160-5, 160-6 or 160-N from the master catalog 116-0 are automatically applied to the catalog 116 of the content distribution node 120 receiving them.

In step 244, the first content distribution node 120-1 compares a first catalog entry 160-1 of the first catalog 116-1 within the first content distribution node 120-1 with a second catalog entry 160-2 of a second catalog 120-2 accessed from at least one second content distribution node 120-2. The comparison identifies a difference between the first and second catalog 116-1, 116-2, thus indicating a modification condition.

Step 244 further defines the step of the detecting a modification condition within the first catalog 116-1 (e.g. see steps 214 to 218) to include detecting the modification condition by comparing information in two content distribution nodes 120. In other words, step 244 defines the step of comparing the first catalog 116-1 of the first content distribution node 120-1 to the second catalog 116-2 of the second content distribution of 120-2. The catalog maintainer 118 in each node can perform this task.

In step 246, the first content distribution node 120-1 repeats the step of comparing using different first catalog entries 160-1 to identify any additional modification conditions. Step 246, therefore, describes a method for identifying the modification conditions by which an entire catalog 120 can be updated (e.g., from beginning or first entry to the end or the last entry). Accordingly, the first content distribution node 120-1 successively compares one first catalog entry 160-1 after the other to the catalog entries 160-2 and or gap locations 140 of the second catalog 120-2 until all of the modification conditions have been identified, and for each, appropriate insertions, deletions and/or version updates have been undertaken. Catalog maintainers 118 in the various content distribution nodes 120 may be configured to have an order or list indicating a subset of other catalogs 116 of other nodes 120 that they periodically (e.g., nightly) or continuously compare their local catalog 116 to. As an example referring back to FIG. 1, the first content distribution node 120-1 may continuously compare its catalog contents 116-1 with the master catalog 116-0, while the second content distribution node 120-2 continuously compares its catalog contents 116-2 with the first catalog 116-1, while the Nth content distribution node 120-N continuously compares its catalog contents 116-1 with the master catalog 116-0.

In one arrangement, a complete reconciliation between two catalogs 116 results from each of the two catalogs sending all of their entries 160 to the other catalog 116. In another arrangement, a complete reconciliation between two catalogs results from one of the two catalogs 116 sending all of its entries 160 and gaps 130, 140 to the other catalog.

Figure 7:
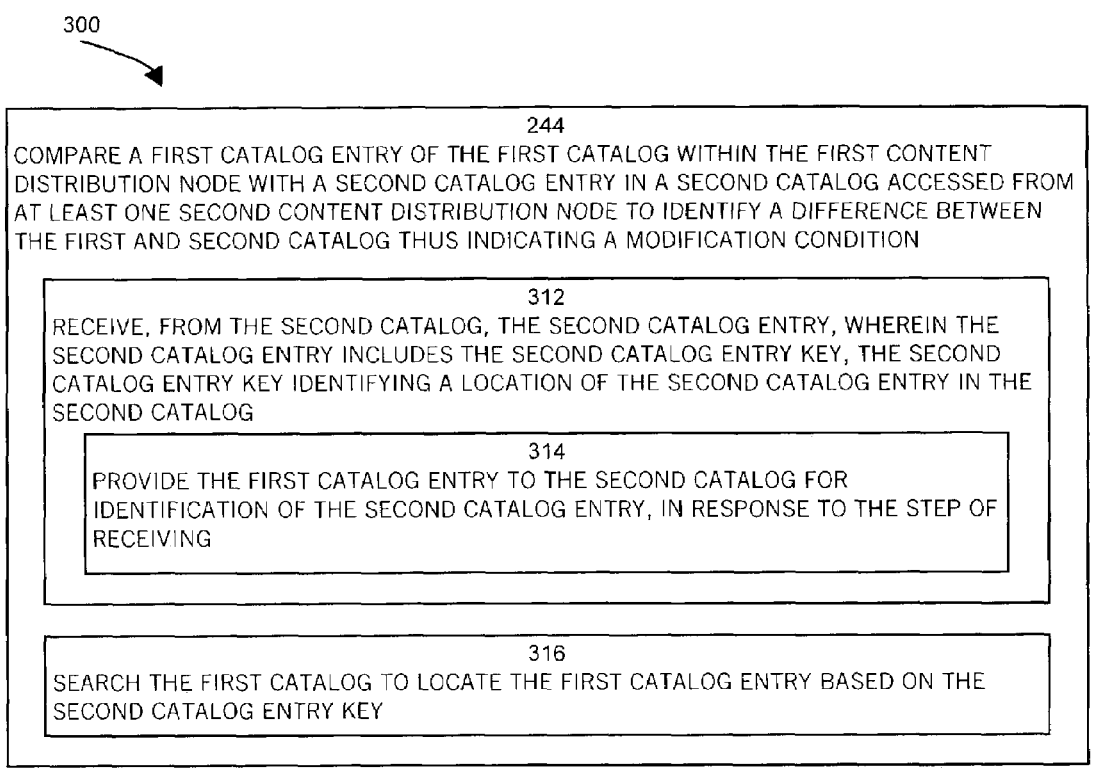
FIG. 7 is a flow chart of a procedure for indicating the modification condition according to one embodiment of the invention.

FIG. 7 is a flow chart of a procedure for indicating the modification condition according to one embodiment of the invention.

In step 244, the first content distribution node 120-1 compares a first catalog entry 160-1 of the first catalog 116-1 within the first content distribution node 120-1 with a second catalog entry 160-2 in a second catalog 116-2 accessed from at least one second content distribution node 120-2. The comparison identifies a difference between the first and second catalog 116-1, 116-2 thus indicating a modification condition. Step 244 was described in detail earlier with respect to FIG. 6. Steps 312 through 316, which follow, provide additional details of the procedure described by step 244.

In step 312, the first content distribution node 120-1 receives, from the second catalog 116-2, the second catalog entry 160-2, wherein the second catalog entry 160-2 includes the second catalog entry key 143. The second catalog entry key 143 identifies a location of the second catalog entry 160-2 in the second catalog 120-2.

For example, in certain embodiments, the second content distribution node 120-2 selects and sends a series of catalog entries 160-2 to the first content distribution node 120-1 for comparison to catalog entries 160-1 and gap locations 141-1 in the first content distribution node 120-1. The first content distribution node 120-1 may, in fact, receive catalog entries 160 from multiple content distribution nodes 120 seeking to update their catalogs 116.

The content distribution nodes 120 may use various mechanisms to locate catalog entries 160 within the content distribution nodes 120. In one embodiment, for example, the content distribution nodes 120 search catalog entries 160 in the first catalog 116-1, second catalog 116-2 and/or other catalogs 116-N using indexed keys. The keys may be simple or compound indexes, other identifiers (e.g. URL's), etc.

In other embodiments, the content distribution nodes 120 may use other mechanisms to locate catalog entries 160. For example, some content distribution nodes 120 use a search and selection process; certain other content distribution nodes 120 are configured to use a search process through an ordered table (i.e. the catalog 116). Other methods may also be used to find catalog entries 160 in the content distribution nodes 120. The method employed by a first content distribution node 160 may or may not be the same method that a second or other content distribution node 160 uses to find a catalog entry 160. Different methods can be employed as long as the different methods produce the same mapping from the entry key 133, 143 to the entry 160.

In step 314, the first content distribution node 120-1 provides the first catalog entry 160-1 for comparison to the second catalog 160-2 for identification of the second catalog entry 160-2, in response to the step of receiving.

In other words, in some cases, receipt of the catalog entries 160-2 from the second content distribution node 120-2 or other content distribution nodes 120-N could result in the updating of the first content distribution node 120-1, as described with respect to step 312. In other cases, however, the first content distribution node 120-1 initially sends a catalog entry 160-1 to the second or other content distribution node 120-N. Then in response, the second or other content distribution node 120-N sends back either a second catalog entry 160-2 or a gap location 140 version information 141 from which the first content distribution node 120-1 can then update its own catalog 116-1.

In step 316, the first content distribution node 120-1 searches the first catalog 116-1 to locate the first catalog entry 160-1 based on the second catalog 116-2 entry key 143.

When the first content distribution node 120-1 receives a second catalog entry 160-2, the second catalog entry 160-2 contains the same second catalog entry key 143 that was used for finding the second catalog entry 160-2 within the second catalog 116-2. At that point the first content distribution node uses the second catalog entry key 143 to find the first catalog entry 160-1.

FIG. 8 is a flow chart providing details of a procedure for indicating the modification condition according to one embodiment of the invention.

In step 244, the first content distribution node 120-1 compares a first catalog entry 160-1 of the first catalog 116-1 within the first content distribution node 120-1 with a second catalog entry 160-2 in a second catalog 116-2 which was accessed from at least one second content distribution node 120-2. The comparison identifies a difference between the first and second catalog 120-1, 120-2 thus indicating a modification condition. Step 244 was described earlier, in detail, with respect to FIGS. 6 and 7. As before, the following steps (i.e. steps 332 through 342) provide additional details of the procedure described by step 244.

Steps 332 through 342 describe details of alternative methods for triggering a modification condition.

In step 332, the first content distribution node 120-1, searches the first catalog 116-1 with a second catalog entry key 143 to locate the first catalog entry 160-1. When the first content distribution node 120-1 receives a second catalog entry 160-2, the second catalog entry 160-2 contains the same second catalog entry key 143 that was used for finding the second catalog entry 160-2 within the second catalog 116-2. At that point the first content distribution node uses the second catalog entry key 143 to find the first catalog entry 160-1.

In step 334, if the first catalog entry 160-1 is not found, the first content distribution node 120-1 triggers the modification condition associated with the first catalog 116-1 of the first content distribution node 120-1. This occurrence indicates, in other words, that a second catalog entry 160-2 exists for which there is no corresponding first catalog entry 160-1. Thus, the first content distribution node 120-1 triggers a modification condition.

In step 336, if the first catalog entry 160-1 is found, the first content distribution node 120-1 triggers the modification condition if entry version information 132 from the first catalog entry 160-1 is different from entry version information 142 from the second catalog entry 160-2. In contrast to steps 332 and 334, step 336 refers to the situation in which a first catalog entry 160-1 that corresponds to the received second catalog entry 120-2 is found within the first content distribution node 120-1. In such a case, the modification condition exists if the entry version information 131 of the first catalog entry 160-1 differs from the entry version information 141 of the second catalog entry 160-2. Accordingly, when that occurs, the first content distribution node 160-1 triggers the modification condition.

Steps 338 through 342 describe an alternative situation to the case in which the first content distribution node 120-1 compares a catalog entry 160-1 of the first catalog 116-1 to a catalog entry 160-2 of the second catalog 116-2. Step 338 through 342 describe the situation in which the first content distribution node 120-1 compares a catalog entry 160-1 of the first catalog 116-1 to gap version information 141 of the second catalog 120-2.

In step 338, the first content distribution node 120-1 provides the first catalog entry 160-1 for comparison to a second catalog gap 141 that corresponds to the first catalog entry 160-1. Although this step describes the procedure for comparing one first catalog entry 160-1 at a time, the procedure provides a mechanism by which the first content distribution node 120-1 can successively update its catalog 116-1 of catalog entries 160-1. Upon receipt of the first catalog entry 160-1 from the first content distribution node 120-1, the second content distribution node 120-2 obtains a first catalog 116-1 entry key 133 from the first catalog entry 160-1. The first content distribution node 120-1 uses the first catalog 116-1 entry key 133 to identify a gap location 140 corresponding to the first catalog 116-1 entry key 133 received from the first content distribution node 120-1.

In step 340, the first content distribution node 120-1 receives, from the second catalog 116-2, gap version information 141 of the second catalog 116-2 gap location 140, in response to providing the first catalog entry 160-1. The first content distribution node 120-1 then compares the gap version information 141, from the second catalog 116-2 to the first content distribution node 120-1 first catalog entry 160-1 that was also originally sent to the second content distribution node 120-2.

In step 342, if the entry version information 132 of the first catalog entry 160-1 is older than the gap version information 141 of the second catalog 116-2 gap location 130, the first content distribution node 120-1 triggers the modification condition associated with the first catalog 116-1 of the first content distribution node 120-1. In that case, a catalog modification will be made to the first catalog 116-1. The first content distribution node 120-1 deletes the catalog entry 160-1.

Figure 9:
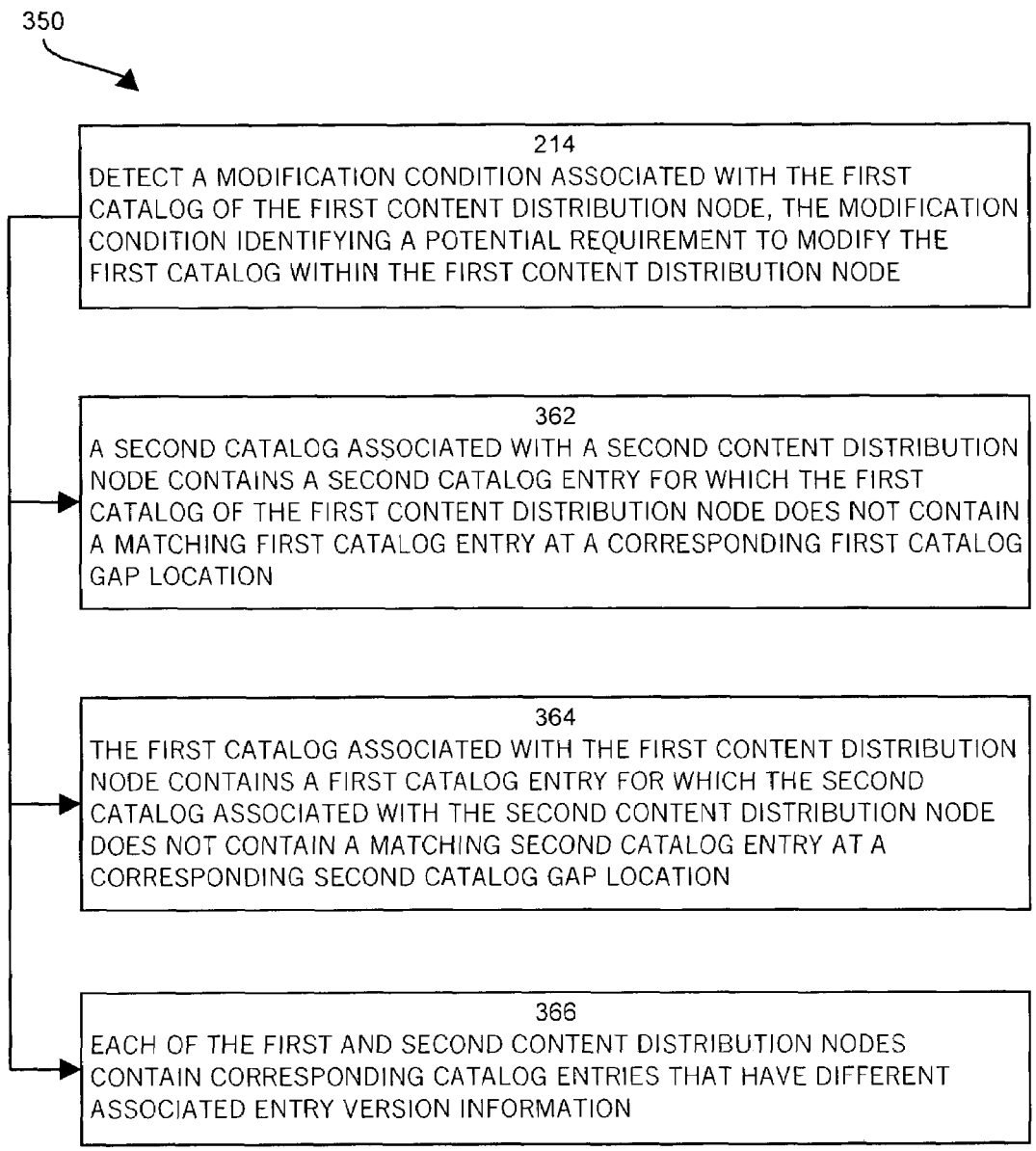
FIG. 9 is a flow chart providing additional details of the procedure for indicating the modification condition according to one embodiment of the invention.

FIG. 9 is a flow chart providing details of a procedure for indicating the modification condition according to one embodiment of the invention. FIG. 9 provides a description of alternative occurrences within a content distribution network 101 indicating a modification condition of the first content distribution node 120-1.

In step 214, the first content distribution node 120-1 detects a modification condition associated with the first catalog 116-1 of the first content distribution node 120-1, the modification condition identifying a potential requirement to modify the first catalog 116-1 within the first content distribution node 120-1. Step 214 was described earlier with respect to FIGS. 5 and 6. Steps 362 through 366 that follow describe the alternative occurrences within a content distribution network 101 indicating a modification condition of the first content distribution node 120-1.

In step 362, a second catalog 116-2 associated with a second content distribution node 120-2 contains a second catalog entry 160-2 for which the first catalog 116-1 of the first content distribution node 120-1 does not contain a matching first catalog entry 160-1 at a corresponding first catalog 116-1 gap location 130. Steps 382 through 388, provided in FIG. 10, describe details of the steps undertaken by the first content distribution node 120-1 in this situation.

In step 364, the first catalog 116-1 associated with the first content distribution node 120-1 contains a first catalog entry 160-1 for which the second catalog 116-2 associated with the second content distribution node 120-2 does not contain a matching second catalog entry 160-2 at a corresponding second catalog gap location 140. Steps 412 through 422, provided in FIG. 11, describe details of the steps undertaken by the first content distribution node 120-1 in this situation.

In step 366, each of the first and second content distribution nodes 120-1, 120-2 contain corresponding catalog entries 160-1, 160-2 that have different associated entry version information 132, 142. Steps 422 through 444, provided in FIG. 12, describe details of the steps undertaken by the first content distribution node 120-1 in this situation.

Figure 10:
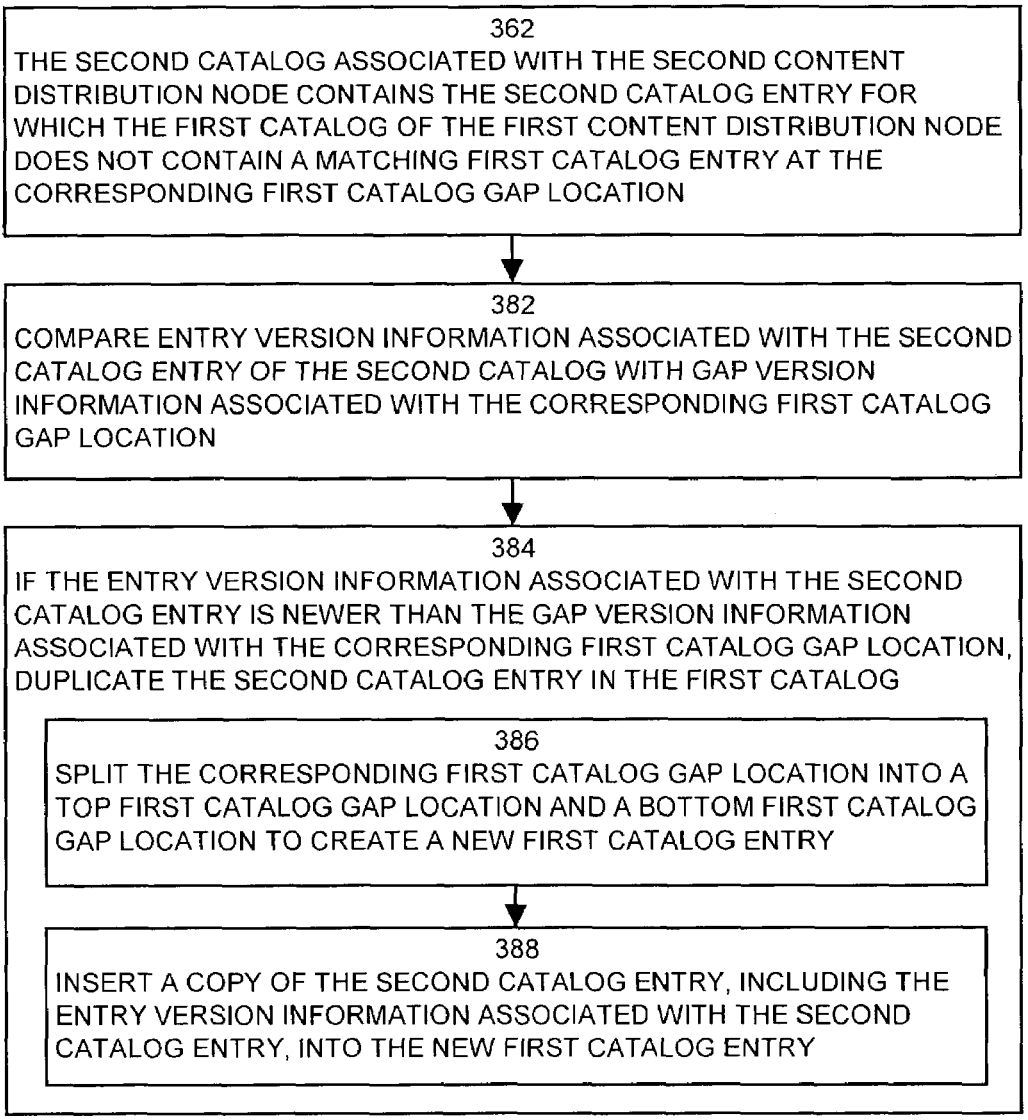
FIG. 10 is a flow chart providing additional details of the procedure for indicating the modification condition according to one embodiment of the invention.

FIG. 10 is a flow chart providing additional details of a procedure for indicating the modification condition according to one embodiment of the invention.

In step 362, the second catalog 116-2 associated with the second content distribution node 120-2 contains the second catalog entry 160-2 for which the first catalog 116-1 of the first content distribution node 120-1 does not contain a matching first catalog entry 160-1 at the corresponding first catalog gap location 130.

Because content distribution nodes 120 obtain catalog entries 160 from other content distribution nodes 120, it is possible for the second content distribution node 120-2 to have received a prior catalog entry 160 (e.g. from yet a third content distribution node 120-N) that the first content distribution node 120-1 didn't also receive. Another possible occurrence is for the first content distribution node 120-1, at some prior time, to have received an update (e.g. a gap location 140 version information 141 that caused a change in the catalog 120-1) from another content distribution node 120-N that resulted in the deletion of the first catalog entry 160-1 earlier.

In step 382, the first content distribution node 120-1 compares entry version information 142 associated with the second catalog entry 160-2 of the second catalog 120-2 with gap version information 131 associated with the corresponding first catalog 116-1 gap location 130. In doing so, the first content distribution node 120-1 identifies whether the creation of the entry version information 142 or the creation of gap version information 131 is newer.

In step 384, if the entry version information 142 associated with the second catalog entry 160-2 is newer than the gap version information 131 associated with the corresponding first catalog 116-1 gap location 131, the first content distribution node 120-1 duplicates the second catalog entry 160-2 in the first catalog 116-1.

If the version information of the second catalog entry 160-2 indicates that the second catalog entry 160-2 was created after the gap information 131 in the first catalog 120-1, two explanations are possible. Either no prior catalog entry 160-1 existed at the gap location 131 in the first catalog 116-1 or a prior catalog entry 160-1 existed but was deleted before the creation of the newer version of the catalog entry 160-2 in the second catalog 116-2.

In step 386, the first content distribution node 120-1 splits the corresponding first catalog 116-1 gap location 131 into a top first catalog gap location 131-1 and a bottom first catalog gap location 131-2 to create a new first catalog entry 160-1. For example, assume that the entry version information 142 in the second catalog 116-2 has a version number of "4" and the gap version information 131 of the corresponding gap location 140 in the first catalog 116-1 is "2". Then, following step 384, the first content distribution node 120-1 duplicates the second catalog entry 160-2 in the first catalog 116-1. In turn, the first content distribution node 120-1 splits the gap location 130 (e.g. in the first content distribution node 120-1 corresponding to the catalog entry 160-2 in the second catalog 116-2) into two gap locations 130. The content distribution node 120-1 thereby creates a top first catalog gap location 130-1, located above the catalog entry 160-1 (e.g. the catalog entry 160-1 that was duplicated from the second catalog entry 160-2 of the second catalog 116-2). The content distribution node 120-1 also creates a bottom first catalog gap location 130-2 located below the catalog entry 160-1, duplicated from the same second catalog entry 160-2.

In step 388, the first content distribution node 120-1 inserts a copy of the second catalog entry 160-2, including the entry version information 142 associated with the second catalog entry 160-2, into the new first catalog entry 160-1. Following, therefore, from the description of the above example, the new (i.e. duplicated) entry version information 132 of the first catalog entry 160-1 is "4". The new (i.e. split) top and bottom gap version information 131-1, 131-2 of the top and bottom first catalog gap locations 130-1, 130-2 are both "2".

FIG. 11 is a flow chart providing additional details of a procedure for indicating the modification condition according to one embodiment of the invention.

In step 364, the first catalog 116-1 associated with the first content distribution node 120-1 contains the first catalog entry 160-1 for which the second catalog 116-2 of the second content distribution node 120-2 does not contain a matching second catalog entry 160-2 at the corresponding second catalog entry location 141 (e.g. the gap location at which the second catalog entry 160-2 would be located, if it existed).

Step 364 describes the opposite occurrence of step 362. In other words, the first content distribution node 120-1 may have received a prior catalog entry 160-N (e.g. from yet a third content distribution node 120-N) that the second content distribution node 120-2 didn't also receive. In the alternative, the second content distribution node 120-2, at some prior time, may have received an update (e.g. become aware of gap location 130, 140 version information 131, 141 from another content distribution node 120-N that causes a deletion of a catalog entry 160-2).

In step 412, the first content distribution node 120-1 compares entry version information 132 associated with the first catalog 120-1 with gap version information 141 associated with a corresponding second catalog gap location 140. For example, assume that the catalog entry 160-1 version information 133 is "3" and the corresponding gap version information 141 associated with a corresponding second catalog 116-2 gap location is "5". In other words, the catalog entry 160-1 version information 133 is older than the corresponding second catalog 116-2 gap location version information 141. Assume also, that the top and bottom gap locations 130-1, 130-2 version information 131-1, 131-2 are "1" and "2", respectively.

In step 414, if the entry version information 133 associated with the first catalog entry 160-1 is older than the gap version information 141 associated with a corresponding second catalog 116-2 gap location 141, delete the first catalog entry 160-1 from the first catalog 116-1. Therefore, according the example described in the immediately preceding steps, the first content distribution node 120-1 deletes the first catalog entry 160-1 from the first catalog 116-1.

In step 416, the first content distribution node 120-1 combines top and bottom gap locations 131-1, 131-2 adjacent to the deleted first catalog entry 160-1 to create a new gap location 131. The combined gap location 131 will then be located in the position formerly held by the now-deleted first catalog entry 160-1.

In step 418, the first content distribution node 120-1 updates gap version information 131 associated with the new gap location by the procedure described in the following steps.

Accordingly, in step 420, the first content distribution node 120-1 selects a maximum of gap version information 131 associated with the top first gap location 131-1, gap version information associated with the bottom gap location 131-2 and the entry version information 132-1 associated with the deleted first catalog entry 160-1. Continuing with the same example, the maximum is selected of the gap version information associated with the top first gap location 131-1 of "1", gap version information associated with the bottom gap location 131-2 of "2" and the entry version information 132-1 associated with the deleted first catalog entry 160-1 of "3". That is, "3" is selected as the new gap version.

In step 422, the first content distribution node 120-1 increments the gap version information 131 associated with the new gap location. Accordingly, the new gap version information is incremented by an additional version, from "3" to "4".

Figure 12:
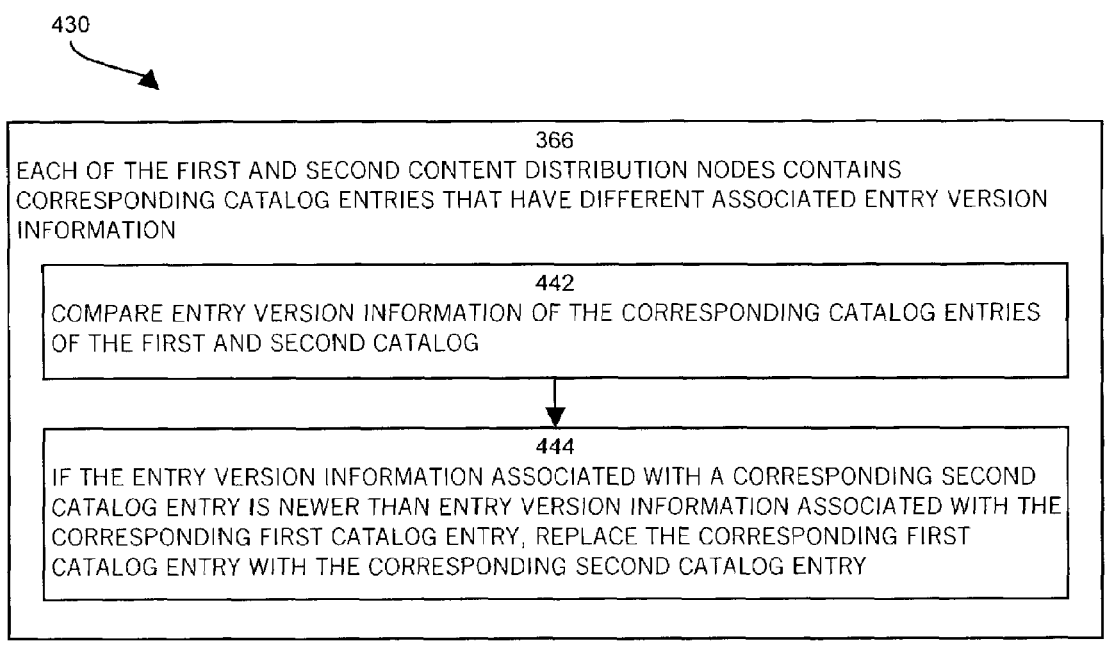
FIG. 12 is a flow chart providing additional details of the procedure for indicating the modification condition according to one embodiment of the invention.

FIG. 12 is a flow chart providing additional details of a procedure for indicating a modification condition according to one embodiment of the invention.

In step 366, each of the first and second content distribution nodes 120-1, 120-2 contains corresponding catalog entries 160 that have different associated entry version information 132, 142. In this case, determination of whether to replace either of the catalog entries 160 is relegated to a determination of whether either catalog entry 160 is older than the other catalog entry 160.

In step 442, the first content distribution node 120-1 compares entry version information 132, 142 of the corresponding catalog entries of the first and second catalog 120-1, 120-2. Accordingly, the first content distribution node 120-1 makes a determination as to which catalog entry 120-1, 120-2 is newer.

In step 444, if the entry version information 142 associated with a corresponding second catalog entry 160-2 is newer than entry version information 132 associated with the corresponding first catalog entry 160-1, replace the corresponding first catalog entry 160-1 with the corresponding second catalog entry 160-2. Hence the newer catalog entry 160-2 is maintained in both content distribution nodes 120-1, 120-2.

Figure 13:
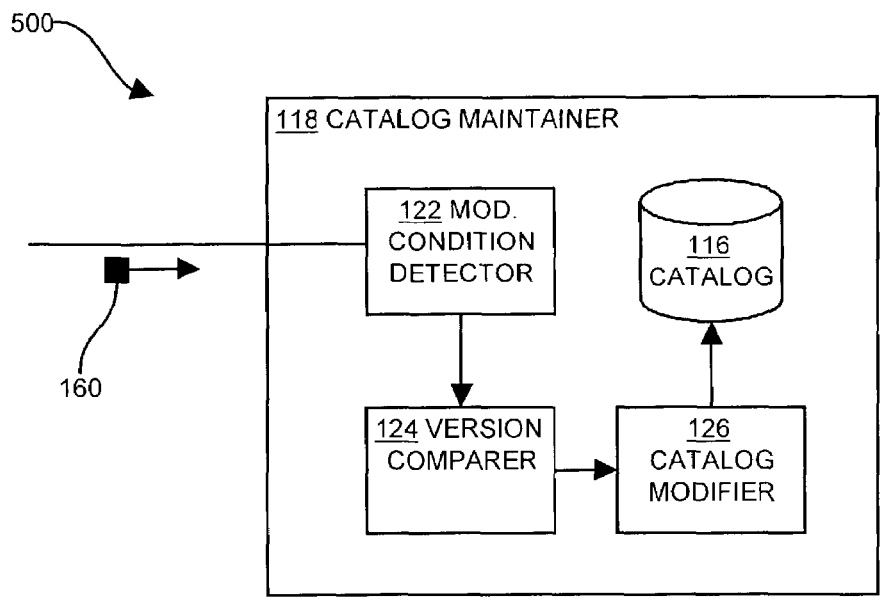
FIG. 13 is a diagram of a catalog maintainer according to one embodiment of the invention.

FIG. 13 is a diagram of a catalog maintainer 118 according to one embodiment of the invention. The catalog maintainer 118 includes various components such as a modification condition detector 122, a version comparer 124, a catalog modifier 126 and the catalog 116. The components of the catalog maintainer 118 conduct the functional operations described as follows on behalf of the various content distribution nodes 120.

The catalog 116 operates as described earlier, herein.

The modification detector detects the modification condition by comparing catalog entries 160 and/or gap locations 130 of different catalogs 116. For example, the modification detector 122 compares a catalog entry 160-1 of the first catalog 116-1 to the corresponding catalog entry 160-2 of the second catalog 116-2. If the version information 132, 142 of both catalog entries 160-1, 160-2 is different, the modification condition detector 122 identifies that the modification condition exists and the content distribution node 120 will conduct a version-based comparison of the catalog entries 160. In another example, if the modification condition detector 122 determines that there is no corresponding catalog entry 160-1 in the first catalog 116-1 to a catalog entry 160-2 from the second catalog 116-2, the modification condition detector 122 identifies the existence of the modification condition.

The version-based comparer 124 performs a comparison of the version information 132, 142, 131, 141 of two catalog entries 160 or of a catalog entry 160 and a catalog gap location 130,140. In that way, the version comparer 124 makes a determination of which catalog entry 160 or gap location 130, 140 is more up-to-date. In one example, therefore, the version comparer 124 identifies that a particular catalog entry 160-1 version information 132 is "1" but that the corresponding gap location 140-2 version information 141 from second catalog 116-2 is "3". The difference of the version information 132, 141 provides the basis for recognition that the gap version information 141 is more up-to-date than the catalog entry 160-1 version information 132, and that, accordingly, the catalog entry 160-1 should be deleted.

As described earlier, in the detailed procedures, the catalog modifications performed by a content distribution node 120 are primarily undertaken by the catalog modifier 126. Such modifications include, for example, inserting a catalog entry 160, deleting a catalog entry 160 and updating catalog entry 160 version information 132,142 or gap version information 131, 141.

For example, after deleting a catalog entry 160-1, as described above, the catalog modifier 126 selects a maximum gap version, which, in the example described above was the corresponding gap location 140 version information 141 from the second catalog 116-2, that is "3". Finally, the catalog modifier 126 increments the maximum version of "3" by one version and assigns a new version of "4" to the newly created gap location 130-1.

Figure 14:
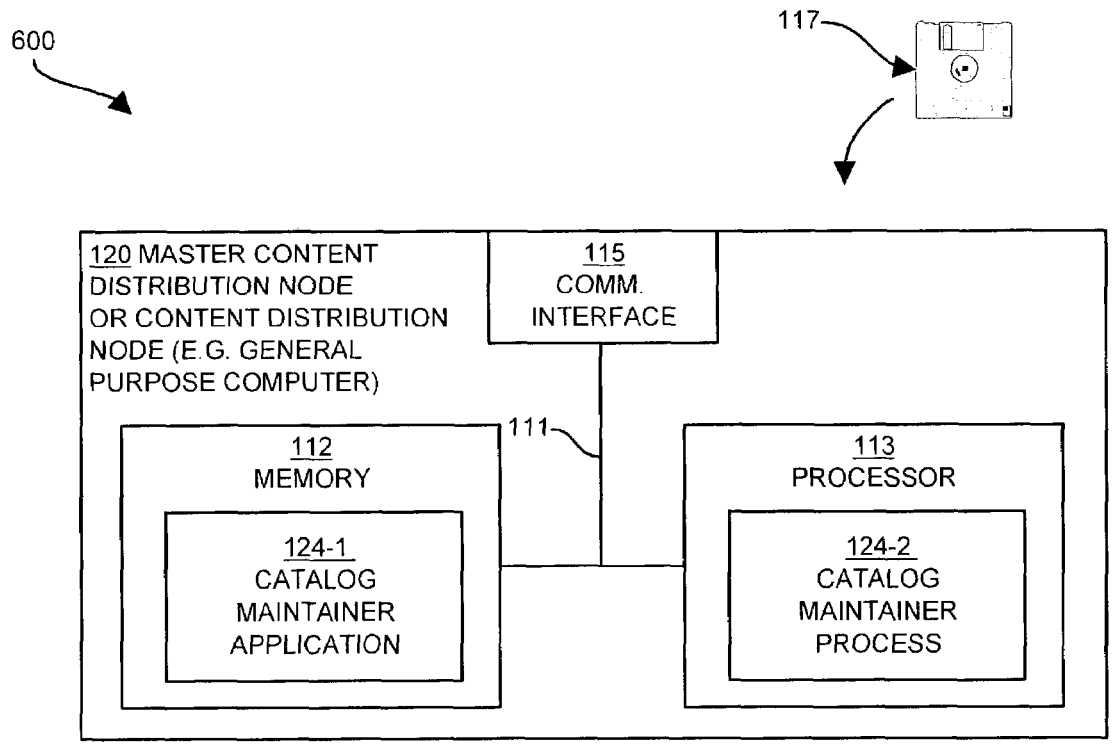
FIG. 14 depicts a general-purpose computer implementation of the catalog maintainer according to one embodiment of the invention.

FIG. 14 depicts a general purpose computer implementation of a content distribution node 120 performing the functions of a catalog maintainer 118 according to one embodiment of the invention. The example content distribution node 120 includes an interconnection mechanism 111 (e.g., a data bus and/or circuitry) which couples a memory 112 (e.g., any computer readable medium such as random access memory (RAM) and/or read only memory (ROM) or even a disk or storage medium) having a catalog maintainer application 124-1, a processor 113 (e.g., a microprocessor or central processing unit) having a catalog maintainer process 124-1 and a communications interface 115 (e.g., modem or other network interface). The communications interface 115 allows the content distribution node 120 to communicate with other content distribution nodes 120 within a content distribution network 101 via the network 110.

The memory 112 is encoded with logic instructions and/or data that forms a catalog maintainer application 124-1 configured according to the embodiments of the invention that operates a catalog maintainer process 124-2 in the processor 113.

FIG. 15 shows an example insertion of a catalog entry 160-1 into the first catalog 116-1 of the first content distribution node 120-1 according to one embodiment of the invention. The figure shows the first catalog 116-1 (i.e. depicted in the middle of the figure) of the first content distribution node 120-1. The example first catalog 116-1 has two catalog entry keys 133-1-1 and 133-1-3 and associated version information of V1 and V1 132-1-1 and 132-1-2, respectively. The example first catalog 116-1 also has gap version information V0, V0, and V0 131-1-1, 131-1-2 and 131-1-3 associated with the catalog entry keys 133-1-1 and 133-1-3.

On the left, the figure shows an example second catalog 116-2. The example second catalog 116-2 has three catalog entry keys 143-1-1, 143-1-2 and 143-1-3 and associated version information V1, V1 and V1 142-1-1, 142-1-2 and 142-1-3, respectively. The example second catalog 116-2 also has gap version information V0, V0, V0 and V0 141-1-1, 141-1-2, 141-1-3 and 141-1-4 associated with the catalog entry keys 143-1-1, 143-1-2 and 143-1-3. The first content distribution node 120-1 compares catalog entries 160-1 of the first catalog 116-1 to catalog entries 160-2 of the second catalog 116-2 in order to identify any modification conditions. Then the first content distribution node 120-1 modifies the first catalog 116-1 as shown in the example first catalog 116-1 depicted in the "after-modification" sample first catalog 116-1 at the right side of the figure. The example after-modification first catalog 116-1, has three catalog entry keys 133-1-1, 133-1-2 and 133-1-3 and associated version information V1, V1 and V1 132-1-1, 132-1-3 and 132-1-2, respectively. The example after-modification first catalog 116-1 also has gap version information V0, V0, V0 and V0 131-1-1, 131-1-4, 131-1-5 and 131-1-3 associated with the catalog entries 133-1-1, 133-1-3 and 133-1-2.

In the example 710, the first content distribution node 120-1 compares first catalog entries 160-1 of the first catalog 116-1 (e.g. represented by entry key 133-1-1 and 133-1-3) to the second catalog entries 160-2 (e.g. represented by entry key 143-1-1, 143-1-2 and 143-1-3), one at a time. To make such a comparison, the first content distribution node 120-1 receives successive catalog entries 160-2 from the second content distribution node 120-2. Upon receipt of each catalog entry 160-2, the first content distribution node 120-1 locates the corresponding first catalog entry 160-1 or gap location 130 and compares the second catalog entry 160-2 to the corresponding first catalog entry 160-1 or gap location 130. Identification of the corresponding catalog entry 160-1 is performed by using a second catalog entry key 143 to search for the corresponding first catalog entry 160-1 using the first catalog entry key 133 in the first catalog 116-1.

In the example, upon receipt of the catalog entry 160-2 represented by "entry key 2" 143-1-2 from the second catalog 116-2, the first content distribution node 120-1 determines the existence of a modification condition due to the absence of a corresponding catalog entry 160-1 within the first catalog 116-1. Because of the existence of the modification condition, the first content distribution node 120-1 performs a version-based comparison. The version-based comparison compares the entry version information 142-1-2, namely V1 of the "entry key 2" 143-1-2 catalog entry 160-2 of the second catalog 116-2 to the gap version information 131-1-2, namely V0 of the first catalog 116-1 gap location 130 between the "entry key 1" 133-1-1 and "entry key 3" 133-1-3 catalog entries 160-1. Accordingly, the first content distribution node 120-1 identifies, based on the version-based comparison, that a catalog change condition exists. Accordingly the first content distribution node 120-1 inserts a duplicate of the "entry key 2" 143-1-2 second catalog entry 160-2 into the first catalog 116-1. FIG. 15 shows the after-modification depiction of the first catalog 116-1 which includes an "entry key 2" 133-1-2 on the right.

In addition to inserting a duplicate of "entry key 2" 133-1-2 into the first catalog 116-1, the first content distribution node 120-1 splits the existing gap location between the "entry key 1" 133-1-1 and "entry key 3" 133-1-3 catalog entries 160-1. This creates two new gap locations 130 with the same version information 131-1-4, 131-1-5 as the original gap location 130, namely V0.

FIG. 16 shows an additional sample insertion of a catalog entry 160 into the first catalog 116-1 of the first content distribution node 120-1 according to one embodiment of the invention. The figure shows the first catalog 116-1 (i.e. depicted in the middle of the figure) of the first content distribution node 120-1. The example first catalog 116-1 has three catalog entry keys 133-2-1, 133-2-2 and 133-2-3 and associated version information V1, V1 and V1 132-2-1, 132-2-3 and 132-2-2, respectively. The example first catalog 116-1 also has gap version information V0, V0, V0 and V0 131-2-1, 131-2-4, 131-2-5 and 131-2-3 associated with the catalog entry keys 133-2-1, 133-2-2 and 133-2-3.

On the left, the figure shows an example second catalog 116-2. The example second catalog 116-2 has four catalog entry keys 143-2-1, 143-2-2, 143-2-3 and 143-2-4 and associated version information V1, V1, V1 and V2 142-2-1, 142-2-2, 142-2-3 and 142-2-4, respectively. The example second catalog 116-2 also has gap version information V0, V0, V0, V0 and V0 141-2-1, 141-2-2, 141-2-3, 141-2-4 and 141-2-5 associated with the catalog entry keys 143-2-1, 143-2-2, 143-2-3 and 143-2-4. The first content distribution node 120-1 compares catalog entries 160-1 of the first catalog 116-1 to catalog entries 160-2 of the second catalog 116-2 in order to identify any modification conditions. Then the first content distribution node 120-1 modifies the first catalog 116-1 as demonstrated in the example first catalog 116-1 depicted in the "after-modification" first catalog 116-1 at the right side of the figure. The example after-modification first catalog 116-1, has four catalog entry keys 133-2-1, 133-2-2, 133-2-3 and 133-2-4 and associated version information V1, V1, V1 and V2 132-2-1, 132-2-3, 132-2-2 and 132-2-4, respectively. The example modified first catalog 116-1 also has gap version information V0, V0, V0, V0 and V0 131-2-1, 131-2-4, 131-2-5, 131-2-6 and 131-2-7 associated with the catalog entry keys 133-2-1, 133-2-2, 133-2-3 and 133-2-4.

In the example 720, another insertion is demonstrated highlighting two differences with respect to the insertion demonstrated in FIG. 15. In this example, unlike FIG. 15, a new catalog entry 160-2 is inserted at the end of the catalog table. In this example, also, the catalog entry 160-2 being inserted into the first catalog 116-1 is not the initial catalog entry version but rather version V2 of the particular catalog entry 160-2.

Just as in the case of the earlier example, the first content distribution node 120-1 receives catalog entries from the second content distribution node 120-2 for comparison to the first content distribution node's 120-1 own catalog entries 160-1 and gap locations 130. Upon receipt of the catalog entry 160-2 represented by "entry key 4" 143-2-4 the first content distribution node 120-1 conducts the same comparison as described for the catalog entry 160-2 represented by "entry key 2" 143-1-2 in FIG. 15. In this case, the first content distribution node 120-1 inserts the "entry key 4" 133-2-4 catalog entry 160-1 in its proper location after the "entry key 3" 133-2-3 catalog entry 160-2. In this case also, as occurred with respect to inserting the gap location in the middle of the catalog 116-1, as depicted in FIG. 15, the first content distribution node 120-1 splits the gap location 130. That is, the first content distribution node 120-1 splits the gap location 130, (i.e. corresponding to the "entry key 4" 143-2-4 second catalog entry 160-2) into two gap locations 133-2-6, 131-2-7.

In addition to inserting the "entry key 4" into the first catalog 116-1, the first content distribution node 120-1 maintains the V2 version information 142-2-4 of the "entry key 4" 133-2-4 catalog entry 160-2 in its new location 132-2-4 within the first catalog 116-1. The existence of a version number other than the initial version, raises the possibility of different explanations for the occurrence. As discussed earlier, the configuration of certain embodiments of the invention that allow for updating content distribution nodes 120 from other than the master content distribution node 120-0 creates the possibility that different content distribution nodes will be updated at different rates of speed. Accordingly, in this example, it is possible that the "entry key 4" version information was initially set at V1, then updated by another content distribution node 120-N to V2 before the occasion arose for the first content distribution node 120-1 to update itself from the second content distribution node 120-1. A variety of scenarios are possible. In effect, as long as a content distribution node 120-N gets updated from a master content distribution node 120-0 insertion or deletion command 144, other content distribution nodes 120 may all get updated (e.g. albeit at different rates of speed). This can occur as long as the updates are from any content distribution node 120 update directly or indirectly by the master content distribution node 120-0. As a result of such updating, the content distribution nodes migrate in the direction of the update status of the master content distribution node 120-0.

FIG. 17 shows an example deletion of a catalog entry 160-1 from the first catalog 116-1 of a content distribution node 120-1 according to one embodiment of the invention. The figure shows the first catalog 116-1 (i.e. depicted in the middle of the figure) of the first content distribution node 120-1. The example first catalog 116-1 has four catalog entry keys 133-3-1, 133-3-2, 133-3-3 and 133-3-4 and associated version information V1, V1, V1 and V2 132-3-1, 132-3-2, 132-3-3 and 132-3-4, respectively. The example first catalog 116-1 also has gap version information of V0, V0, V0, V0 and V0 131-3-1, 131-3-2, 131-3-3, 131-3-4 and 131-3-5 associated with the catalog entry keys 133-3-1, 133-3-2, 133-3-3 and 133-3-4.

On the left, the figure shows an example second catalog 116-2. The example second catalog 116-2 has three catalog entry keys 143-3-1, 143-3-3 and 143-3-4 and associated version information V1, V1 and V2 142-3-1, 142-3-2 and 142-3-3, respectively. The example second catalog 116-2 also has gap version information V0, V2, V0 and V0 141-3-1, 141-3-2, 141-3-3 and 141-3-4 associated with the catalog entry keys 143-3-1, 143-3-3 and 143-3-4. The first content distribution node 120-1 compares catalog entries 160-1 of the first catalog 116-1 to catalog entries 160-2 of the second catalog 116-2 in order to identify any modification conditions. Then the first content distribution node 120-1 modifies the first catalog 116-1 as demonstrated in the example first catalog 116-1 depicted in the "after-modification" sample first catalog 116-1 at the right side of the figure. The example after-modification first catalog 116-1, has three catalog entry keys 133-3-1, 133-3-3 and 133-3-4 and associated version information V1, V1 and V2 132-3-1, 132-3-3 and 132-3-4, respectively. The example after-modification first catalog 116-1 also has gap version information V0, V3, V0 and V0 131-3-1, 131-3-6, 131-3-4 and 131-3-5 associated with the catalog entries 133-3-1, 133-3-3 and 133-3-4.

In the example 730, assume that the first content distribution node 120-1 sends successive catalog entries 160-1 to the second content distribution node 120-2 for comparison to the catalog entries 160-2 of the second catalog 116-2. In response, the first content distribution node 120-1 receives either catalog entries 160-2 with entry version information 142 or gap location 140 gap version information 141 from the second catalog 116-1 in order to conduct the first content distribution node's 120-1 comparisons, etc. By comparing entry version information 142 and gap location 140 gap version information 141, as previously described, the first content distribution node 120-1, in this case, identifies the need to delete its "entry key 2" 133-3-2 catalog entry 160-1. After deleting the entry, the first content distribution node 160-1 consolidates the top and bottom gap locations 130-1, 130-2, respectively, of the "entry key 2" 133-3-2 catalog entry 160-1. Then the first content distribution node 120-1 selects the maximum of the second catalog 116-2 catalog entry 160-2 version information 142-3-3, namely, "2", and the top and bottom gap locations 130-1, 130-2 (i.e. prior to consolidating them), both "0". The first content distribution node 120-1 increments the selected maximum version by one version to arrive at a version number of "3" 131-3-6 (See after-modification depiction of the first catalog 116-1 on the right side of FIG. 17).

FIG. 18 shows an additional example deletion of a catalog entry 160-1 from the first catalog 116-1 of a content distribution node 120-1 according to one embodiment of the invention. The figure shows the first catalog 116-1 (i.e. depicted in the middle of the figure) of the first content distribution node 120-1. The example first catalog 116-1 has three catalog entry keys 133-4-1, 133-4-3 and 133-4-4 and associated version information V1, V1 and V2 132-4-1, 132-4-3 and 132-4-4, respectively. The example first catalog 116-1 also has gap version information V0, V3, V0 and V0 131-4-1, 131-4-6, 131-4-4 and 131-4-5 associated with the catalog entry keys 133-4-1, 133-4-3 and 133-4-4.

On the left, the figure shows an example second catalog 116-2. The example second catalog 116-2 has two catalog entry keys 143-4-1 and 143-4-4 and associated version information V1 and V2 142-4-1 and 142-4-2, respectively. The example second catalog 116-2 also has gap version information V0, V4 and V0 141-4-1, 141-4-2 and 141-4-3 associated with the catalog entry keys 143-4-1 and 143-4-4. The first content distribution node 120-1 compares catalog entries 160-1 of the first catalog 116-1 to catalog entries 160-2 of the second catalog 116-2 in order to identify any modification conditions. Then the first content distribution node 120-1 modifies the first catalog 116-1 as demonstrated in the example first catalog 116-1 depicted in the "after-modification" sample first catalog 116-1 at the right side of the figure. The after-modification first catalog 116-1, has two catalog entry keys 133-4-1 and 133-4-4 and associated version information V1 and V2 132-4-1 and 132-4-4, respectively. The after-modification first catalog 116-1 also has gap version information V0, V5 and V0 131-4-1, 131-4-7 and 131-4-5 associated with the catalog entry keys 133-4-1 and 133-4-4.

In the example 740, the first content distribution node 120-1 deletes an additional catalog entry 160-1 adjacent to the gap location 130 created by the prior deletion (e.g. such as the deletion depicted in FIG. 17). As described earlier, the first content distribution node 120-1 receives catalog entries 160-2 with entry version information 142 and gap location 140 gap version information 141 from the second content distribution node 120-2. By comparing entry version information 142 and gap location 140 gap version information 141, as previously described, the first content distribution node 120-1 identifies the need to delete its "entry key 3" 133-4-3 catalog entry 160-1. Accordingly, to delete the "entry key 3" 133-4-3 catalog entry 160-1 the first content distribution node 120-1, after deleting the catalog entry 160-1, consolidates the top and bottom gap locations 130-1, 130-2, respectively, of the "entry key 3" 133-4-3 catalog entry 160-1. Then the first content distribution node 120-1 selects the maximum of the second catalog 116-2 gap version information, namely, "4", and the top and bottom gap locations 130-1, 130-2 (i.e. prior to consolidating them), "3" and "0" respectively. Then the first content distribution node 120-1 increments the selected maximum version of "4" by one version to arrive at a version number of "5" 131-3-6 (See after-modification depiction of the first catalog 116-1 on the right side of FIG. 17). This example demonstrates the change of gap location 130 version information 131 which occurs as a result of each deletion of a catalog entry 160.

Figure 19:
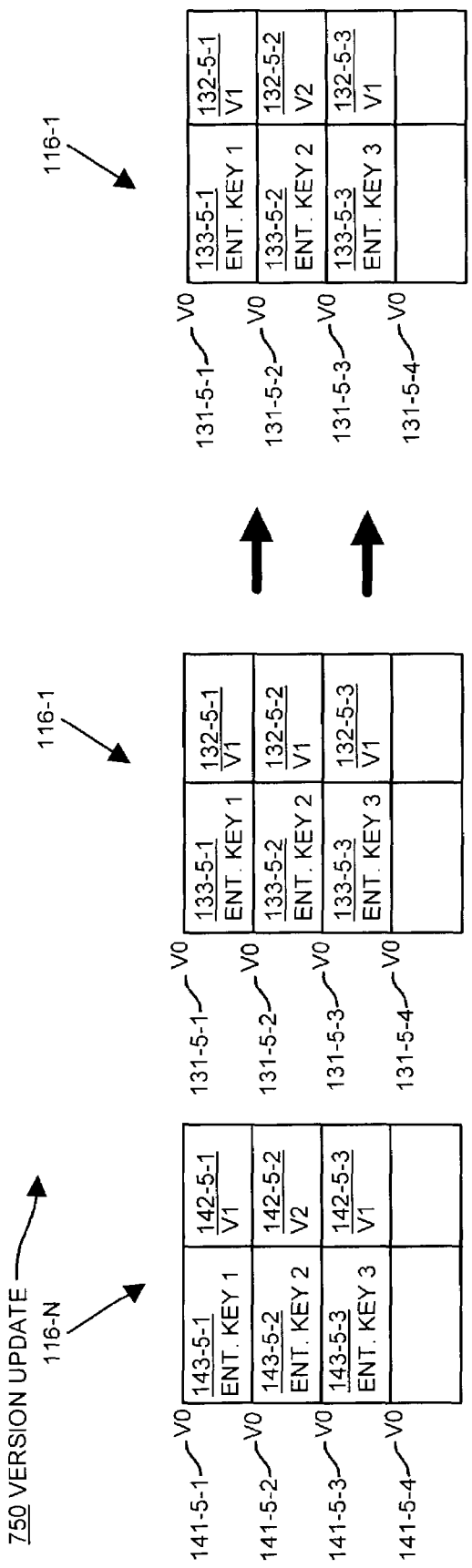
FIG. 19 shows an example update to version information of a catalog entry according to one embodiment of the invention.

FIG. 19 shows an example update to version information 132 of a catalog entry 160-1 of the first catalog 116-1 of a content distribution node 120-1 according to one embodiment of the invention. It should be understood that other changes to content and/or data fields associated with catalog entries 160 may occur other than those requiring insertions or deletions. In other words, for example, the content identified by the catalog entry 160 may have changed and/or data fields associated with the catalog entry 160 may have changed, serving as a basis for updating the version information 132, 142 of an existing catalog entry 160.

The figure shows the first catalog 116-1 (i.e. depicted in the middle of the figure) of the first content distribution node 120-1. The example first catalog 116-1 has three catalog entry keys 133-5-1, 133-5-2 and 133-5-3 and associated version information V1, V1 and V1 132-5-1, 132-5-2 and 132-5-3, respectively. The example first catalog 116-1 also has gap version information V0, V0, V0 and V0 131-5-1, 131-5-2, 131-5-3 and 131-5-4 associated with the catalog entry keys 133-5-1, 133-5-2 and 133-5-3.

On the left, the figure shows an example second catalog 116-2. The example second catalog 116-2 has three catalog entry keys 143-5-1, 143-5-2 and 143-5-3 and associated version information V1, V2 and V1 142-5-1, 142-5-2 and 142-5-3, respectively. The example second catalog 116-2 also has gap version information V0, V0, V0 and V0 141-5-1, 141-5-2, 141-5-3 and 141-5-4 associated with the catalog entry keys 143-5-1, 143-5-2 and 143-5-3. The content distribution node 120-1 compares catalog entries 160-1 of the first catalog 116-1 to catalog entries 160-2 of the second catalog 116-2 in order to identify any modification conditions. Then the first content distribution node 120-1 modifies the first catalog 116-1 as demonstrated in the example first catalog 116-1 depicted in the "after-modification" sample first catalog 116-1 at the right side of the figure. The example after-modification first catalog 116-1, has three catalog entry keys 133-5-1, 133-5-2 and 133-5-3 and associated version information V1, V2 and V1 132-5-1, 132-5-2 and 132-5-3, respectively. The example modified first catalog 116-1 also has gap version information V0, V0, V0 and V0 131-5-1, 131-5-2 131-5-3 and 131-5-4 associated with the catalog entry keys 133-5-1, 133-5-2 and 133-5-3.

In the example 750, both the first catalog entry 160-1 version information 132 and gap location 130 version information 131 and the second catalog entry 160-2 version information 142 and gap location 130 version information 131 are the same with one exception. That is, "entry key 2" 143-5-2 catalog entry 160-2 of the second catalog 116-2 has a more up-to-date entry version 142-5-2 of "2" than the corresponding first catalog 160-1 "entry key 2" 133-5-2 catalog entry 160-2 which is "1". Accordingly, the first content distribution node 120-1, in the process of comparing catalog entries 160 from the first and second catalogs 160-1, 160-2 identifies that the second catalog entry 160-2 version information 142-5-2 is newer than the first catalog entry 160-1 version information 132-5-2. Therefore the first content distribution node 120-1 replaces the corresponding first catalog entry 160-1 133-5-2 with the second catalog entry 160-1 including version information 132-5-2 (i.e. V2).

Embodiments of the invention, as described above, provide techniques and mechanisms for maintaining up-to-date content distribution node catalogs without the need to maintain tombstones to track deleted catalog entries. Only version information for each of the catalog entry and for the gap locations between entries is required. Thus catalogs do not grow excessively even in the case of repeated catalog entry deletions.

While this invention has been particularly shown and described with references to preferred embodiments thereof, it will be understood by those skilled in the art that various changes in form and details may be made therein without departing from the spirit and scope of the invention as defined by the appended claims.

For example, as discussed earlier, the functions of content distribution nodes 120, in addition to being performed in content distribution servers and other devices within content distribution networks 101 may also be deployed and performed in other network devices. Such network devices include but are not limited to routers, bridges, switches, access servers, gateways, hubs, concentrators, proxy servers, repeaters and so forth which exchange data over an interconnection of data links etc.

Also, embodiments of the invention provide additional methods for handling gap locations 130 and gap version information 131 after deleting a first catalog entry 160-1 from a first catalog 116-1. According to one such method, the first content distribution node 120-1 first creates a new gap location 130 at the location of the deleted first catalog entry 160-1. After creating the new gap location 130, the content distribution node 120-1 updates gap version information 131 associated with the new gap location 130 from the gap version information 141 associated with the corresponding second catalog gap location 140.

For example, assume that a first catalog entry 160-1 has entry version information 132 of "3". The first catalog 120-1 compares the first catalog entry 160-1 version information 132 to the second catalog 116-2 corresponding gap location 140 version information 141 of "5" thereby determining that the first catalog entry 160-1 should be deleted. Upon deleting the first catalog entry 160-1, the first content distribution node 120-1 creates the new gap location 130 then updates the gap version information 131 associated with the new gap location 130 from the gap version information 141 associated with the corresponding second catalog gap location 140, namely "5".

In the next step, if a top gap location 130 adjacent to the deleted first catalog entry 160-1 has gap version information 131 that is equivalent to the gap version information 141 associated with the corresponding second catalog gap location 140 or a bottom gap location 130 adjacent to the deleted first catalog entry 130 has gap version information 131 that is equivalent to the gap version information 141 associated with the corresponding second catalog gap location 140, then the content distribution node 120-1 combines that top and/or bottom gap location 130 with the new gap location 130.

In other words, in the example, if the top gap location 130 of the now-deleted first catalog entry 130 is "5" then the content distribution node 120-1 combines the top gap location 130 (i.e. of the now-deleted first catalog entry 160-1) with the newly-created gap location 130. Also, if the bottom gap location 130 of the now-deleted first catalog entry 130 is "5" then the content distribution node 120-1 combines the bottom gap location 130 (i.e. of the now-deleted first catalog entry 160-1) with the newly-created gap location 130.

Embodiments of the invention also provide another method for handling gap locations 130 and gap version information 131 after deleting a first catalog entry 160-1 from a first catalog 116-1. Accordingly, the first content distribution node 120-1 receives, from the second catalog 116-2, the second catalog entry key 143 from the second catalog entry 160-2 that is above the corresponding second catalog gap location 140. The first content distribution node 120-1 also receives, from the second catalog 116-2, the second catalog entry key 143 from the second catalog entry 160-2 that is below the corresponding second catalog gap location 140. Then the first content distribution node 120-1 compares the two second catalog entry keys 143 (i.e. from the second catalog entries 160-2 above and below the corresponding second catalog gap location 140). If the second catalog entry key 143 from the second catalog entry 160-2 above the corresponding second catalog gap location 140 matches the second catalog entry key 160-2 from the second catalog entry 160-2 below the corresponding second catalog gap location 140, the first content distribution node 120-1 combines the top and bottom first gap locations 130 adjacent to the deleted first catalog entry 160-1 to create a new gap location 130.

In such cases, it is also possible to end up with adjacent gap locations 130 having different version information 131 within the first catalog 116-1.

In an example of the second alternative for handling gap locations 130 and gap version information 131 after deleting a first catalog entry 160-1 assume that a catalog entry 160-1 representing an audio file of "Barry White in Concert" exists in the first catalog 116-1. Assume also that the first catalog 116-1 receives a corresponding second catalog entry 160-2 that causes the deletion of the first catalog entry 160-1 (i.e. the first catalog entry 160-1 with the catalog entry key 133 "Barry White in Concert"). In addition to the corresponding second gap location 140, the first catalog 116-1 also receives two catalog entry keys 133 "Barry Manilo Live" and "Beetles Greatest Hits 1" for catalog entries 160-2 representing audio files above and below the corresponding second gap location 140. Because the received entry keys 133 do not match, the first content distribution node 120-1 does not consolidate the gap locations 130 on either side of the deleted first catalog entry 130 (i.e. the deleted catalog entry 160-1 with the "Barry White in Concert" catalog entry key 133).

On the other hand, assume for example, that the content distribution node 120-1 were to receive the corresponding second catalog gap location 140 with two catalog entry keys 133 that match, for example, such as two "Barry White in Concert" entry keys 133. In that situation, the first content distribution node 120-1 consolidates the gap location 140 above the deleted first catalog entry 130 and the gap location 140 below the deleted first catalog entry 130 into one gap location 140.

What is claimed is:

1. In a first content distribution node, a method for maintaining a first catalog, the method comprising the steps of:

detecting a modification condition associated with the first catalog of the first content distribution node, the modification condition identifying a potential requirement to modify the first catalog within the first content distribution node;

in response to detecting the modification condition, performing a version-based comparison technique on the first catalog based on the modification condition to identify a catalog change condition, wherein the version-based comparison technique compares at least one of:

gap version information associated with the modification condition to at least one of gap version information and entry version information associated with the first catalog, and gap version information associated with the first catalog to at least one of gap version information and entry version information associated with the modification condition, wherein a gap is a logical identifier of a boundary between two entries in a catalog, and wherein each gap location has associated version information; and determining that the catalog change condition indicates a catalog modification is required to be made to the first catalog, and in response, modifying the first catalog in accordance with the catalog change condition identified by the version-based comparison technique.

2. The method of claim 1 wherein the step of detecting the modification condition comprises the step of:

receiving, from a master content distribution node, at least one of:

i) an insert catalog entry command; and ii) a delete catalog entry command;

each of the insert and delete catalog entry commands indicating a respective insertion or deletion operation of a catalog entry to the first catalog of the first content distribution node.

3. The method of claim 1 wherein the step of detecting the modification condition comprises the step of:

comparing a first catalog entry of the first catalog within the first content distribution node with a second catalog entry in a second catalog accessed from at least one second content distribution node to identify a difference between the first and second catalog thus indicating a modification condition.

4. The method of claim 3 wherein the step of comparing comprises the steps of:

receiving, from the second catalog, the second catalog entry, wherein the second catalog entry includes a second catalog entry key, the second catalog entry key identifying a location of the second catalog entry in the second catalog;

searching the first catalog to locate the first catalog entry based on the second catalog entry key; and based on searching the first catalog with the second catalog entry key to locate the first catalog entry, determining that the first catalog entry is not found, and in response, triggering the modification condition associated with the first catalog of the first content distribution node.

5. The method of claim 4 wherein determining comprises determining that the first catalog entry is found, and in response, determining that entry version information from the first catalog entry is different from entry version information from the second catalog entry, and in response, triggering the modification condition.

6. The method of claim 4 wherein the step of receiving is undertaken in response to providing the first catalog entry to the second catalog for identification of the second catalog entry.

7. The method of claim 3 wherein the step of comparing comprises:
providing the first catalog entry for comparison to a catalog gap that corresponds to the first catalog entry;
in response to providing the first catalog entry, receiving from the second catalog, gap version information of a second catalog gap; and
determining that the entry version information of the first catalog entry is older than the gap version information of the second catalog gap, and in response, triggering the modification condition associated with the first catalog of the first content distribution node.

8. The method of claim 3 comprising the step of repeating the step of comparing using different first catalog entries to identify any additional modification conditions.

9. The method of claim 1 wherein the modification condition provides at least one indication that:
i) a second catalog associated with a second content distribution node contains a second catalog entry for which the first catalog of the first content distribution node does not contain a matching first catalog entry at a corresponding first catalog gap location;
ii) the first catalog associated with the first content distribution node contains a first catalog entry for which the second catalog associated with the second content distribution node does not contain a matching second catalog entry at a corresponding second catalog gap location; and
iii) each of the first and second content distribution nodes contain corresponding catalog entries that have different associated entry version information.

10. The method of claim 9 wherein the first catalog comprises a set of catalog entries, each catalog entry capable of maintaining an identity of content to be distributed by a content distribution network, a first catalog entry key and respective entry version information, each catalog entry including at least one gap location having associated gap version information.

11. The method of claim 10 wherein the modification condition indicates that:
the second catalog associated with the second content distribution node contains the second catalog entry for which the first catalog of the first content distribution node does not contain a matching first catalog entry at the corresponding first catalog gap location; and
wherein the step of performing the version-based comparison technique on the first catalog in response to detecting the modification condition comprises the steps of:
comparing entry version information associated with the second catalog entry of the second catalog with gap version information associated with the corresponding first catalog gap location; and
determining that the entry version information associated with the second catalog entry is newer than the gap version information associated with the corresponding first catalog gap location, and in response, duplicating the second catalog entry in the first catalog.

12. The method of claim 11 wherein the step of duplicating the second catalog entry in the first catalog comprises:

splitting the corresponding first catalog gap location into a top first catalog gap location and a bottom first catalog gap location to create a new first catalog entry; and
inserting a copy of the second catalog entry, including the entry version information associated with the second catalog entry, into the new first catalog entry.

13. The method of claim 10 wherein the modification condition indicates that:
the first catalog associated with the first content distribution node contains the first catalog entry for which the second catalog of the second content distribution node does not contain a matching second catalog entry at the corresponding second catalog entry location; and
wherein the step of performing a version-based comparison technique on the first catalog based on the modification condition comprises the steps of:
comparing entry version information associated with the first catalog with gap version information associated with a corresponding second catalog gap location; and
determining that the entry version information associated with the first catalog entry is older than the gap version information associated with a corresponding second catalog gap location, and in response, deleting the first catalog entry from the first catalog.

14. The method of claim 13 wherein the step of deleting the first catalog entry from the first catalog comprises:
combining top and bottom gap locations adjacent to the deleted first catalog entry to create a new gap location; and
updating gap version information associated with the new gap location by:
i) selecting a maximum of gap version information associated with the top first gap location, gap version information associated with the bottom gap location and the entry version information associated with the deleted first catalog entry; and
ii) incrementing the gap version information associated with the new gap location.

15. The method of claim 13 wherein the step of deleting the first catalog entry from the first catalog comprises:
creating a new gap location at the location of the deleted first catalog entry;
updating gap version information associated with the new gap location from the gap version information associated with the corresponding second catalog gap location; and
combining, with the new gap location, any of a top gap location adjacent to the deleted first catalog entry having gap version information that is equivalent to the gap version information associated with the corresponding second catalog gap location and a bottom gap location adjacent to the deleted first catalog entry having gap version information that is equivalent to the gap version information associated with the corresponding second catalog gap location.

16. The method of claim 13 wherein the step of deleting the first catalog entry from the first catalog comprises:
receiving, from the second catalog, the second catalog entry key from the second catalog entry above the corresponding second catalog gap location and the second catalog entry key from the second catalog entry below the corresponding second catalog gap location; and
determining that the second catalog entry key from the second catalog entry above the corresponding second catalog gap location matches the second catalog entry key from the second catalog entry below the corresponding second catalog gap location, and in response, combining top and bottom first gap locations adjacent to the deleted first catalog entry to create a new gap location.

17. The method of claim 10 wherein the modification condition is that:
each of the first and second content distribution nodes contain corresponding catalog entries that have different associated entry version information; and
wherein the step of performing the version-based comparison technique on the first catalog based on the modification condition comprises the steps of:
comparing entry version information of the corresponding catalog entries of the first and second catalog; and
determining that the entry version information associated with a corresponding second catalog entry is newer than entry version information associated with the corresponding first catalog entry, and in response, replacing the corresponding first catalog entry with the corresponding second catalog entry.

18. In a content distribution node, a method for inserting a catalog entry into a catalog of the content distribution node, the method comprising the steps of:
finding an entry location for insertion of a catalog entry;
at the entry location, splitting a gap location into top and bottom gap locations, wherein a gap is a logical identifier of a boundary between two entries in a catalog, and wherein each gap location has associated version information; and
inserting the catalog entry into the catalog between the top and bottom gap locations.

19. In a content distribution node, a method for deleting a catalog entry from a catalog of the content distribution node, the method comprising the steps of:
deleting the catalog entry;
consolidating top and bottom gap locations adjacent to the deleted catalog entry to create a new gap location, wherein a gap is a logical identifier of a boundary between two entries in a catalog, and wherein each gap location has associated version information; and
updating gap version information associated with the new gap location by selecting a maximum gap version information associated with the top first gap location, gap version information associated with the bottom gap location and entry version information associated with the deleted catalog entry.

20. A first content distribution node, for maintaining a first catalog, comprising:
a memory;
a communications interface;
a processor;
an interconnection interface coupled to the memory, the processor and the communications interface;
wherein the memory is configured with a catalog maintenance application, that during performance on the processor maintains the first catalog by performing the steps of:
detecting a modification condition associated with the first catalog of the first content distribution node, the modification condition identifying a potential requirement to modify the first catalog within the first content distribution node;
in response to detecting the modification condition, performing a version-based comparison technique on the first catalog based on the modification condition to identify a catalog change condition, wherein the version-based comparison technique compares at least one of:
gap version information associated with the modification condition to at least one of gap version information and entry version information associated with the first catalog, and
gap version information associated with the first catalog to at least one of gap version information and entry version information associated with the modification condition,
wherein a gap is a logical identifier of a boundary between two entries in a catalog, and wherein each gap location has associated version information; and
determining that the catalog change condition indicates a catalog modification is required to be made to the first catalog, and in response, modifying the first catalog in accordance with the catalog change condition identified by the version-based comparison technique.

21. The first content distribution node of claim 20 wherein, when the first content distribution node performs the step of detecting the first content distribution node performs the operation of:
receiving, from a second content distribution node, at least one of:
i) an insert catalog entry command; and
ii) a delete catalog entry command;
each of the insert and delete catalog entry commands indicating a respective insertion or deletion operation of a catalog entry to the first catalog of the first content distribution node.

22. The first content distribution node claim 20 wherein, when the first content distribution node performs the step of detecting the first content distribution node performs the operation of:
comparing a first catalog entry of the first catalog within the first content distribution node with a second catalog entry in a second catalog accessed from at least one second content distribution node to identify a difference between the first and second catalog thus indicating a modification condition.

23. The first content distribution node of claim 22 wherein when the first content distribution node performs the step of comparing the first content distribution node performs the operations of:
receiving, from the second catalog, the second catalog entry, wherein the second catalog entry includes a second catalog entry key, the second catalog entry key identifying a location of the second catalog entry in the second catalog;
searching the first catalog to locate the first catalog entry based on the second catalog entry key; and
based on searching the first catalog with the second catalog entry key to locate the first catalog entry, determining that the first catalog entry is not found, and in response, triggering the modification condition associated with the first catalog of the first content distribution node.

24. The first content distribution node of claim 23 wherein when the first content distribution node performs the step of determining, the first content distribution node performs the operations of determining that the first catalog entry is found, and in response, determining that entry version information from the first catalog entry is different from entry version information from the second catalog entry, and in response, triggering the modification condition.

25. The first content distribution node of claim 23 wherein the first content distribution node undertakes the step of receiving in response to providing the first catalog entry to the second catalog for identification of the second catalog entry.

26. The first content distribution node of claim 22 wherein when the first content distribution node performs step of comparing the first content distribution node performs the operations of:
  providing the first catalog entry for comparison to a catalog gap that corresponds to the first catalog entry;
  in response to providing the first catalog entry, receiving from the second catalog, gap version information of a second catalog gap; and
  determining that the entry version information of the first catalog entry is older than the gap version information of the second catalog gap, and in response, triggering the modification condition associated with the first catalog of the first content distribution node.

27. The first content distribution node of claim 22 wherein the first content distribution node repeats the step of comparing using different first catalog entries to identify any additional modification conditions.

28. The first content distribution node of claim 20 wherein the modification condition provides at least one indication that:
  i) a second catalog associated with a second content distribution node contains a second catalog entry for which the first catalog of the first content distribution node does not contain a matching first catalog entry at a corresponding first catalog gap location;
  ii) the first catalog associated with the first content distribution node contains a first catalog entry for which the second catalog associated with the second content distribution node does not contain a matching second catalog entry at a corresponding second catalog gap location; and
  iii) each of the first and second content distribution nodes contain corresponding catalog entries that have different associated entry version information.

29. The first content distribution node of claim 28 wherein the first catalog comprises a set of catalog entries, each catalog entry capable of maintaining an identity of content to be distributed by a content distribution network, a first catalog entry key and respective entry version information, each catalog entry including at least one gap location having associated gap version information.

30. The first content distribution node of claim 29 wherein the modification condition indicates that:
  the second catalog associated with the second content distribution node contains the second catalog entry for which the first catalog of the first content distribution node does not contain a matching first catalog entry at the corresponding first catalog gap location; and
  wherein when the first content distribution node performs the version-based comparison technique on the first catalog in response to detecting the modification condition the first content distribution node performs the operations of:
    comparing entry version information associated with the second catalog entry of the second catalog with gap version information associated with the corresponding first catalog gap location; and
    determining that the entry version information associated with the second catalog entry is newer than the gap version information associated with the corresponding first catalog gap location, and in response, duplicating the second catalog entry in the first catalog.

31. The first content distribution node of claim 30 wherein when the first content distribution node performs the step of duplicating the second catalog entry in the first catalog the first content distribution node performs the operations of:
  splitting the corresponding first catalog gap location into a top first catalog gap location and a bottom first catalog gap location to create a new first catalog entry; and
  inserting a copy of the second catalog entry, including the entry version information associated with the second catalog entry, into the new first catalog entry.

32. The first content distribution node of claim 29 wherein when the modification condition indicates that:
  the first catalog associated with the first content distribution node contains the first catalog entry for which the second catalog of the second content distribution node does not contain a matching second catalog entry at the corresponding second catalog entry location; and
  wherein when the first content distribution node performs a version-based comparison technique on the first catalog based on the modification condition, the first content distribution node performs the operations of:
    comparing entry version information associated with the first catalog with gap version information associated with a corresponding second catalog gap location; and
    determining that the entry version information associated with the first catalog entry is older than the gap version information associated with a corresponding second catalog gap location, and in response, deleting the first catalog entry from the first catalog.

33. The first content distribution node of claim 32 wherein when the first content distribution node performs the step of deleting the first catalog entry from the first catalog the first content distribution node performs the operations of:
  combining top and bottom gap locations adjacent to the deleted first catalog entry to create a new gap location; and
  updating gap version information associated with the new gap location by:
    i) selecting a maximum of gap version information associated with the top first gap location, gap version information associated with the bottom gap location and the entry version information associated with the deleted first catalog entry; and
    ii) incrementing the gap version information associated with the new gap location.

34. The first content distribution node of claim 32 wherein, when the first content distribution node performs the step of deleting the first catalog entry from the first catalog the first content distribution node performs the operations of:
  creating a new gap location at the location of the deleted first catalog entry;
  updating gap version information associated with the new gap location from the gap version information associated with the corresponding second catalog gap location; and
  combining, with the new gap location, any of a top gap location adjacent to the deleted first catalog entry having gap version information that is equivalent to the gap version information associated with the corresponding second catalog gap location and a bottom gap location adjacent to the deleted first catalog entry having gap version information that is equivalent to the gap version information associated with the corresponding second catalog gap location.

35. The first content distribution node of claim 32 wherein, when the first content distribution node performs the step of deleting the first catalog entry from the first catalog the first content distribution node performs the operations of:
receiving, from the second catalog, the second catalog entry key from the second catalog entry above the corresponding second catalog gap location and the second catalog entry key from the second catalog entry below the corresponding second catalog gap location; and
determining that the second catalog entry key from the second catalog entry above the corresponding second catalog gap location matches the second catalog entry key from the second catalog entry below the corresponding second catalog gap location, and in response, combining top and bottom first gap locations adjacent to the deleted first catalog entry to create a new gap location.

36. The first content distribution node of claim 22 wherein the modification condition is that:
each of the first and second content distribution nodes contain corresponding catalog entries that have different associated entry version information; and
wherein when the first content distribution node performs the version-based comparison technique on the first catalog based on the modification condition the first content distribution node performs the operations of:
comparing entry version information of the corresponding catalog entries of the first and second catalog; and
determining that the entry version information associated with a corresponding second catalog entry is newer than entry version information associated with the corresponding first catalog entry, and in response, replacing the corresponding first catalog entry with the corresponding second catalog entry.

37. A content distribution node, for maintaining a catalog, comprising:
a memory;
a communications interface;
a processor;
an interconnection interface coupled to the memory, the processor and the communications interface;
wherein the memory is configured with a catalog maintenance application, that during performance on the processor maintains the catalog by performing the steps of:
finding an entry location for insertion of a catalog entry;
at the entry location, splitting a gap location into top and bottom gap locations, wherein a gap is a logical identifier of a boundary between two entries in a catalog, and wherein each gap location has associated version information; and
inserting the catalog entry into the catalog between the top and bottom gap locations.

38. A content distribution node, for maintaining a catalog, comprising:
a memory;
a communications interface;
a processor;
an interconnection interface coupled to the memory, the processor and the communications interface;

wherein the memory is configured with a catalog maintenance application, that during performance on the processor maintains the catalog by performing the steps of:
deleting the catalog entry;
consolidating top and bottom gap locations adjacent to the deleted catalog entry to create a new gap location, wherein a gap is a logical identifier of a boundary between two entries in a catalog, and wherein each gap location has associated version information; and
updating gap version information associated with the new gap location by selecting a maximum gap version information associated with the top first gap location, gap version information associated with the bottom gap location and entry version information associated with the deleted catalog entry.

39. A first content distribution node, for maintaining a first catalog, comprising:
a memory;
a communications interface;
a processor;
an interconnection interface coupled to the memory, the processor and the communications interface;
means, coupled to the processor, for detecting a modification condition associated with the first catalog of the first content distribution node, the modification condition identifying a potential requirement to modify the first catalog within the first content distribution node;
means, coupled to the processor, for, in response to detecting the modification condition, performing a version-based comparison technique on the first catalog based on the modification condition to identify a catalog change condition, wherein the version-based comparison technique compares at least one of:
gap version information associated with the modification condition to at least one of gap version information and entry version information associated with the first catalog, and
gap version information associated with the first catalog to at least one of gap version information and entry version information associated with the modification condition,
wherein a gap is a logical identifier of a boundary between two entries in a catalog, and wherein each gap location has associated version information; and
means, coupled to the processor, for determining that the catalog change condition indicates a catalog modification is required to be made to the first catalog, and in response, modifying the first catalog in accordance with the catalog change condition identified by the version-based comparison technique.

40. A computer program product that includes a computer readable medium having instructions stored thereon for maintaining a first catalog, upon execution the instructions performing the steps of:
detecting a modification condition associated with the first catalog of the first content distribution node, the modification condition identifying a potential requirement to modify the first catalog within the first content distribution node;
in response to detecting the modification condition, performing a version-based comparison technique on the first catalog based on the modification condition to identify a catalog change condition, wherein the version-based comparison technique compares at least one of:

gap version information associated with the modification condition to at least one of gap version information and entry version information associated with the first catalog, and gap version information associated with the first catalog to at least one of gap version information and entry version information associated with the modification condition, wherein a gap is a logical identifier of a boundary between two entries in a catalog, and wherein each gap location has associated version information;

determining that the catalog change condition indicates a catalog modification is required to be made to the first catalog, and in response, modifying the first catalog in accordance with the catalog change condition identified by the version-based comparison technique.

* * * * *